US012787114B2

(12) United States Patent
Cedergren et al.

(10) Patent No.: US 12,787,114 B2
(45) Date of Patent: Nov. 3, 2026

(54) DYNAMIC STARTING OF THE DRX RETRANSMISSION TIMER FOR BOUNDED LATENCY APPLICATIONS

(71) Applicant: Telefonaktiebolaget LM Ericsson (publ), Stockholm (SE)

(72) Inventors: Andreas Cedergren, Bjärred (SE); Du Ho Kang, Sollentuna (SE); Jose Luis Pradas, Stockholm (SE); Sina Maleki, Malmö (SE); Ali Nader, Malmö (SE); Ilmiawan Shubhi, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 303 days.

(21) Appl. No.: 18/562,909

(22) PCT Filed: Jun. 3, 2022

(86) PCT No.: PCT/IB2022/055216
§ 371 (c)(1),
(2) Date: Nov. 21, 2023

(87) PCT Pub. No.: WO2022/254406
PCT Pub. Date: Dec. 8, 2022

(65) Prior Publication Data
US 2024/0292486 A1 Aug. 29, 2024

Related U.S. Application Data

(60) Provisional application No. 63/211,807, filed on Jun. 17, 2021, provisional application No. 63/197,100, filed on Jun. 4, 2021.

(51) Int. Cl.
*H04L 1/1812* (2023.01)
*H04L 1/1829* (2023.01)
(Continued)

(52) U.S. Cl.
CPC .......... *H04W 76/28* (2018.02); *H04L 1/1816* (2013.01); *H04L 1/1848* (2013.01); *H04W 24/08* (2013.01);
(Continued)

(58) Field of Classification Search
CPC .......... H04L 1/12–1896; H04L 5/0001–0098; H04W 24/02–10; H04W 52/02–0296;
(Continued)

(56) References Cited

U.S. PATENT DOCUMENTS

2011/0292852 A1* 12/2011 Kone .................... H04W 76/28
2021/0315046 A1* 10/2021 Xue ...................... H04W 76/28
2022/0264616 A1* 8/2022 Shah .................... H04W 76/28

FOREIGN PATENT DOCUMENTS

EP 3772197 A1 2/2021
WO 2010147956 A2 12/2010

OTHER PUBLICATIONS

International Search Report and Written Opinion for International Patent Application No. PCT/IB2022/055216, mailed Nov. 7, 2022, 19 pages.

* cited by examiner

*Primary Examiner* — Timothy J Weidner
(74) *Attorney, Agent, or Firm* — Sonoda & Kobayashi Intellectual Property Law; Sarvajit S. Patil

(57) ABSTRACT

A method performed by a user equipment to eliminate or reduce a monitoring period for retransmission associated to Discontinuous Transmission (DRX). The method comprises receiving, from a network node, an indication of whether the monitoring period should be monitored by the User Equipment (UE). The method further comprises determining, based on the indication, whether to start a retransmission timer. In response to a determination that the retransmission
(Continued)

timer should be started, the method further comprises starting the retransmission timer.

15 Claims, 20 Drawing Sheets

(51) Int. Cl.

| | |
|---|---|
| ***H04W 24/08*** | (2009.01) |
| ***H04W 52/02*** | (2009.01) |
| ***H04W 56/00*** | (2009.01) |
| ***H04W 72/231*** | (2023.01) |
| ***H04W 72/232*** | (2023.01) |
| ***H04W 76/28*** | (2018.01) |
| ***H04W 76/38*** | (2018.01) |
| ***H04W 84/02*** | (2009.01) |
| ***H04W 88/02*** | (2009.01) |
| ***H04W 88/08*** | (2009.01) |
| ***H04W 92/02*** | (2009.01) |
| ***H04W 92/10*** | (2009.01) |

(52) U.S. Cl.

CPC ... *H04W 52/0209* (2013.01); *H04W 56/0015* (2013.01); *H04W 72/231* (2023.01); *H04W 72/232* (2023.01); *H04W 76/38* (2018.02); *H04W 84/02* (2013.01); *H04W 88/02* (2013.01); *H04W 88/08* (2013.01); *H04W 92/02* (2013.01); *H04W 92/10* (2013.01); *Y02D 30/70* (2020.08)

(58) Field of Classification Search

CPC ......... H04W 56/001–0025; H04W 72/02–569; H04W 76/10–50; H04W 84/02–16; H04W 88/02–12; H04W 92/02–04; H04W 92/10; Y02D 30/70

See application file for complete search history.

DYNAMIC STARTING OF THE DRX RETRANSMISSION TIMER FOR BOUNDED LATENCY APPLICATIONS

CROSS REFERENCE TO RELATED APPLICATION

This application is a 35 U.S.C. § 371 national phase filing of International Application No. PCT/IB2022/055216, filed Jun. 3, 2022, which claims priority to U.S. Provisional Patent Application No. 63/197,100 filed on Jun. 4, 2021, and to U.S. Provisional Patent Application No. 63/211,807 filed on Jun. 17, 2021, the disclosures of which are incorporated herein by reference in their entireties.

FIELD

The present disclosure relates generally to communication systems and, more specifically, to a method and apparatus for eliminating or reducing a monitoring period for retransmissions in a wireless communication system.

BACKGROUND

With the advent of high-bandwidth wireless network such as Long-Term Evolution (LTE) and the fifth generation (5G) New Radio (NR), wireless data transfer rate is faster than ever before. This dramatic increase in bandwidth offers promising support to extended reality (XR) and cloud gaming applications, which, due to the characteristics of these games, demand high data rate and low latency in wireless data transfer.

Extended Reality (XR) comprises Augmented Reality (AR), Virtual Reality (VR), Mixed Reality (MR), and/or everything in between. In a wireless network, XR and cloud gaming applications can be delivered and played on smartphones or other tablet devices. In addition, it is highly desirable to deliver XR and cloud games on Head Mounted Displays (HMDs) (e.g., augmented reality, or AR, glasses). By wearing the HMDs, users can immerse themselves completely in a gaming environment to enjoy a better game-playing experience.

Some HMDs may have embedded 5G modems to provide wireless connectivity, while others may be connected via USB, Bluetooth, or WIFI to a smartphone, which is in turn connected to a 5G network. In either case, to support the gaming application, the 5G network must be able to transmit and receive AR application data with low latency. This requires significant power consumption of the user equipment (UE). Since most users prefer to wear small and light HMDs, the size and weight of HMDs will directly affect user experience and the marketability of HMD products. Power consumption of the HMDs, which is correlated to the size and weight of the device, has a significant bearing on the viability of HMD products. Thus, reducing the power consumption of certain UEs is desirable in a wireless network.

SUMMARY

Various computer-implemented systems, methods, and articles of manufacture for dynamically reducing the monitoring period for DRX retransmissions in a wireless network are described herein.

In one embodiment, a method performed by a user equipment (UE) for eliminating or reducing a monitoring period for retransmission associated to DRX is disclosed. The method comprises receiving, from a network node, an indication of whether the monitoring period should be monitored by the UE. The method further comprises determining, based on the indication, whether to start a retransmission timer. In response to a determination that a retransmission timer should be started, the method further comprises starting the retransmission timer.

In one embodiment, a method performed by a network node for facilitating a user equipment (UE) to eliminate or reduce a monitoring period for retransmission associated to DRX is disclosed. The method comprises determining whether the monitoring period should be monitored by the UE. The method further comprises transmitting, to the UE, an indication based on a determination of whether the monitoring period should be monitored by the UE, wherein a retransmission timer is started based on the indication.

In one embodiment, a method performed by a wireless communication system is provided. The system comprises a network node and a user equipment (UE). The user equipment is served by a serving cell of the network node. The method comprises determining, by the network node, whether a monitoring period should be monitored by the UE. The method further comprises transmitting, from the network node to the UE, an indication of whether the monitoring period should be monitored by the UE. The method further comprises determining, by the UE based on the indication, whether to start a retransmission timer. In response to a determination that a retransmission timer should be started, the method further comprises starting, by the UE, the retransmission timer in accordance with the determination.

Embodiments of a UE, a network node, and a wireless communication system are also provided according to the above method embodiments.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1:
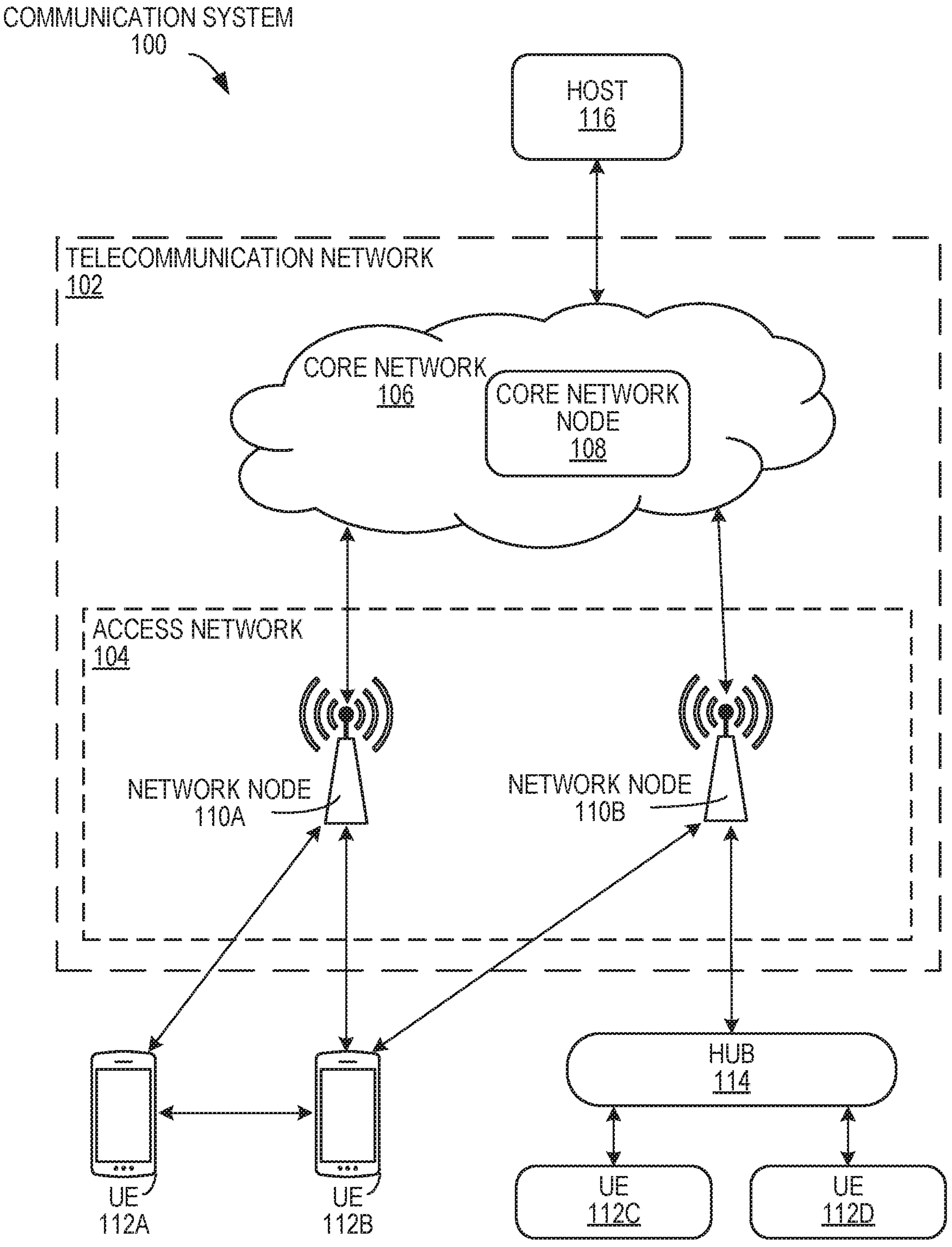
FIG. 1 illustrates an example communication system in accordance with some embodiments.

To provide a more thorough understanding of the present disclosure, the following description sets forth numerous specific details, such as specific configurations, parameters, examples, and the like. It should be recognized, however, that such description is not intended as a limitation on the scope of the present disclosure but is intended to provide a better description of the example embodiments.

Throughout the specification and claims, the following terms take the meanings explicitly associated herein, unless the context clearly dictates otherwise:

The phrase "in one embodiment" as used herein does not necessarily refer to the same embodiment, though it may. Thus, as described below, various embodiments of the present disclosure may be readily combined, without departing from the scope or spirit of the present disclosure.

As used herein, the term "or" is an inclusive "or" operator and is equivalent to the term "and/or," unless the context clearly dictates otherwise.

The term "based on" is not exclusive and allows for being based on additional factors not described unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

In addition, throughout the specification, the meaning of "a", "an", and "the" includes plural references, and the meaning of "in" includes "in" and "on".

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

The present disclosure generally relates to an apparatus and method for dynamically reducing the monitoring period for DRX retransmission in a wireless telecommunication network. While the example embodiments described below are primarily described with respect to 5G communication networks, the disclosure is also applicable to existing technologies such as GSM, 3G, 4G (LTE) and other future technologies, such as 6G networks and beyond.

FIG. 1 shows an example of a communication system 100 in accordance with some embodiments.

In the example, the communication system 100 includes a telecommunication network 102 that includes an access network 104, such as a radio access network (RAN), and a core network 106, which includes one or more core network nodes 108. The access network 104 includes one or more access network nodes, such as network nodes 110*a* and 110*b* (one or more of which may be generally referred to as network nodes 110), or any other similar 3rd Generation Partnership Project (3GPP) access node or non-3GPP access point. The network nodes 110 facilitate direct or indirect connection of user equipment (UE), such as by connecting UEs 112*a*, 112*b*, 112*c*, and 112*d* (one or more of which may be generally referred to as UEs 112) to the core network 106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 100 may include any number of wired or wireless networks, network nodes, UEs, and/or any other components or systems that may facilitate or participate in the communication of data and/or signals whether via wired or wireless connections. The communication system 100 may include and/or interface with any type of communication, telecommunication, data, cellular, radio network, and/or other similar type of system.

The UEs 112 may be any of a wide variety of communication devices, including wireless devices arranged, configured, and/or operable to communicate wirelessly with the network nodes 110 and other communication devices. Similarly, the network nodes 110 are arranged, capable, configured, and/or operable to communicate directly or indirectly with the UEs 112 and/or with other network nodes or equipment in the telecommunication network 102 to enable and/or provide network access, such as wireless network access, and/or to perform other functions, such as administration in the telecommunication network 102.

In the depicted example, the core network 106 connects the network nodes 110 to one or more hosts, such as host 116. These connections may be direct or indirect via one or more intermediary networks or devices. In other examples, network nodes may be directly coupled to hosts. The core network 106 includes one more core network nodes (e.g., core network node 108) that are structured with hardware and software components. Features of these components may be substantially similar to those described with respect to the UEs, network nodes, and/or hosts, such that the descriptions thereof are generally applicable to the corresponding components of the core network node 108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 116 may be under the ownership or control of a service provider other than an operator or provider of the access network 104 and/or the telecommunication network 102, and may be operated by the service provider or on behalf of the service provider. The host 116 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 100 of FIG. 1 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 102 is a cellular network that implements 3GPP standardized features. Accordingly, the telecommunications network 102 may support network slicing to provide different logical networks to different devices that are connected to the telecommunication network 102. For example, the telecommunications network 102 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 112 are configured to transmit and/or receive information without direct human interaction. For instance, a UE may be designed to transmit information to the access network 104 on a predetermined schedule, when triggered by an internal or external event, or in response to requests from the access network 104. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 114 communicates with the access network 104 to facilitate indirect communication between one or more UEs (e.g., UE 112*c* and/or 112*d*) and network nodes (e.g., network node 110*b*). In some examples, the hub 114 may be a controller, router, content source and analytics, or any of the other communication devices described herein regarding UEs. For example, the hub 114 may be a broadband router enabling access to the core network 106 for the UEs. As another example, the hub 114 may be a controller that sends commands or instructions to one or more actuators in the UEs. Commands or instructions may be received from the UEs, network nodes 110, or by executable code, script, process, or other instructions in the hub 114. As another example, the hub 114 may be a data collector that acts as temporary storage for UE data and, in some embodiments, may perform analysis or other processing of the data. As another example, the hub 114 may be a content source. For example, for a UE that is a VR headset, display, loudspeaker or other media delivery device, the hub 114 may retrieve VR assets, video, audio, or other media or data related to sensory information via a network node, which the hub 114 then provides to the UE either directly, after performing local processing, and/or after adding additional local content. In still another example, the hub 114 acts as a proxy server or orchestrator for the UEs, in particular in if one or more of the UEs are low energy IoT devices.

The hub 114 may have a constant/persistent or intermittent connection to the network node 110*b*. The hub 114 may also allow for a different communication scheme and/or schedule between the hub 114 and UEs (e.g., UE 112*c* and/or 112*d*), and between the hub 114 and the core network 106. In other examples, the hub 114 is connected to the core network 106 and/or one or more UEs via a wired connection. Moreover, the hub 114 may be configured to connect to an M2M service provider over the access network 104 and/or to another UE over a direct connection. In some scenarios, UEs may establish a wireless connection with the network nodes 110 while still connected via the hub 114 via a wired or wireless connection. In some embodiments, the hub 114 may be a dedicated hub—that is, a hub whose primary function is to route communications to/from the UEs from/to the network node 110b. In other embodiments, the hub 114 may be a non-dedicated hub—that is, a device which is capable of operating to route communications between the UEs and network node 110b, but which is additionally capable of operating as a communication start and/or end point for certain data channels.

Figure 2:
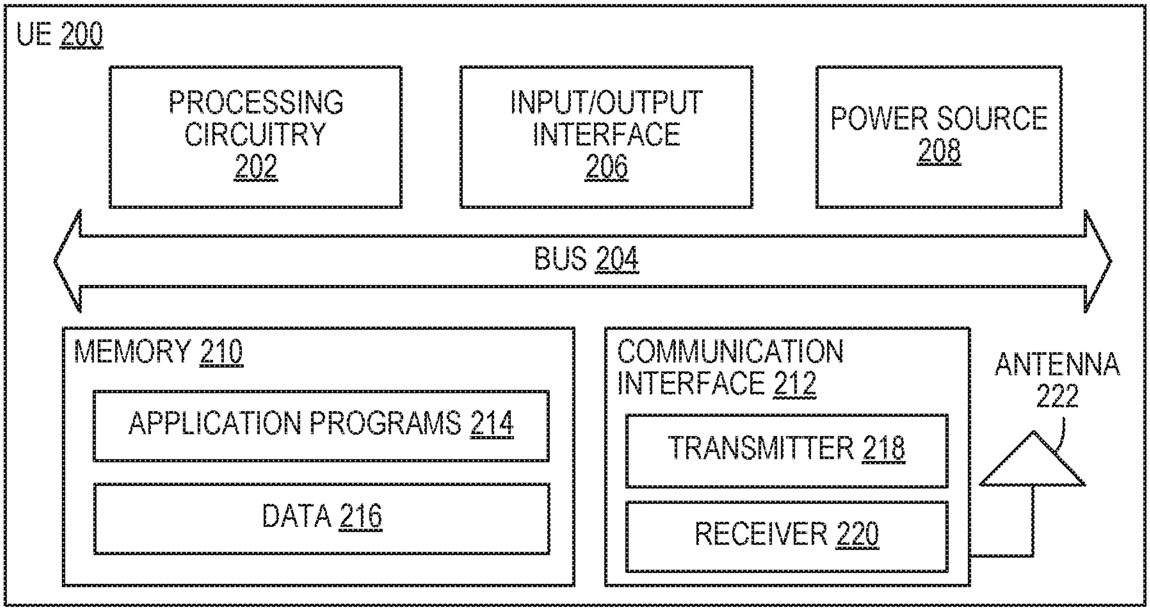
FIG. 2 illustrates an example user equipment in accordance with some embodiments.

FIG. 2 shows a UE 200 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by 3GPP, including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 200 includes processing circuitry 202 that is operatively coupled via a bus 204 to an input/output interface 206, a power source 208, a memory 210, a communication interface 212, and/or any other component, or any combination thereof. Certain UEs may utilize all or a subset of the components shown in FIG. 2. The level of integration between the components may vary from one UE to another UE. Further, certain UEs may contain multiple instances of a component, such as multiple processors, memories, transceivers, transmitters, receivers, etc.

The processing circuitry 202 is configured to process instructions and data and may be configured to implement any sequential state machine operative to execute instructions stored as machine-readable computer programs in the memory 210. The processing circuitry 202 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 202 may include multiple central processing units (CPUs).

In the example, the input/output interface 206 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 200. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 208 is structured as a battery or battery pack. Other types of power sources, such as an external power source (e.g., an electricity outlet), photovoltaic device, or power cell, may be used. The power source 208 may further include power circuitry for delivering power from the power source 208 itself, and/or an external power source, to the various parts of the UE 200 via input circuitry or an interface such as an electrical power cable. Delivering power may be, for example, for charging of the power source 208. Power circuitry may perform any formatting, converting, or other modification to the power from the power source 208 to make the power suitable for the respective components of the UE 200 to which power is supplied.

The memory 210 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 210 includes one or more application programs 214, such as an operating system, web browser application, a widget, gadget engine, or other application, and corresponding data 216. The memory 210 may store, for use by the UE 200, any of a variety of various operating systems or combinations of operating systems.

The memory 210 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 210 may allow the UE 200 to access instructions, application programs and the like, stored on transitory or non-transitory memory media, to off-load data, or to upload data. An article of manufacture, such as one utilizing a communication system may be tangibly embodied as or in the memory 210, which may be or comprise a device-readable storage medium.

The processing circuitry 202 may be configured to communicate with an access network or other network using the communication interface 212. The communication interface 212 may comprise one or more communication subsystems and may include or be communicatively coupled to an antenna 222. The communication interface 212 may include one or more transceivers used to communicate, such as by communicating with one or more remote transceivers of another device capable of wireless communication (e.g., another UE or a network node in an access network). Each transceiver may include a transmitter 218 and/or a receiver 220 appropriate to provide network communications (e.g., optical, electrical, frequency allocations, and so forth). Moreover, the transmitter 218 and receiver 220 may be coupled to one or more antennas (e.g., antenna 222) and may share circuit components, software or firmware, or alternatively be implemented separately.

In the illustrated embodiment, communication functions of the communication interface 212 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 212, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 200 shown in FIG. 2.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 3:
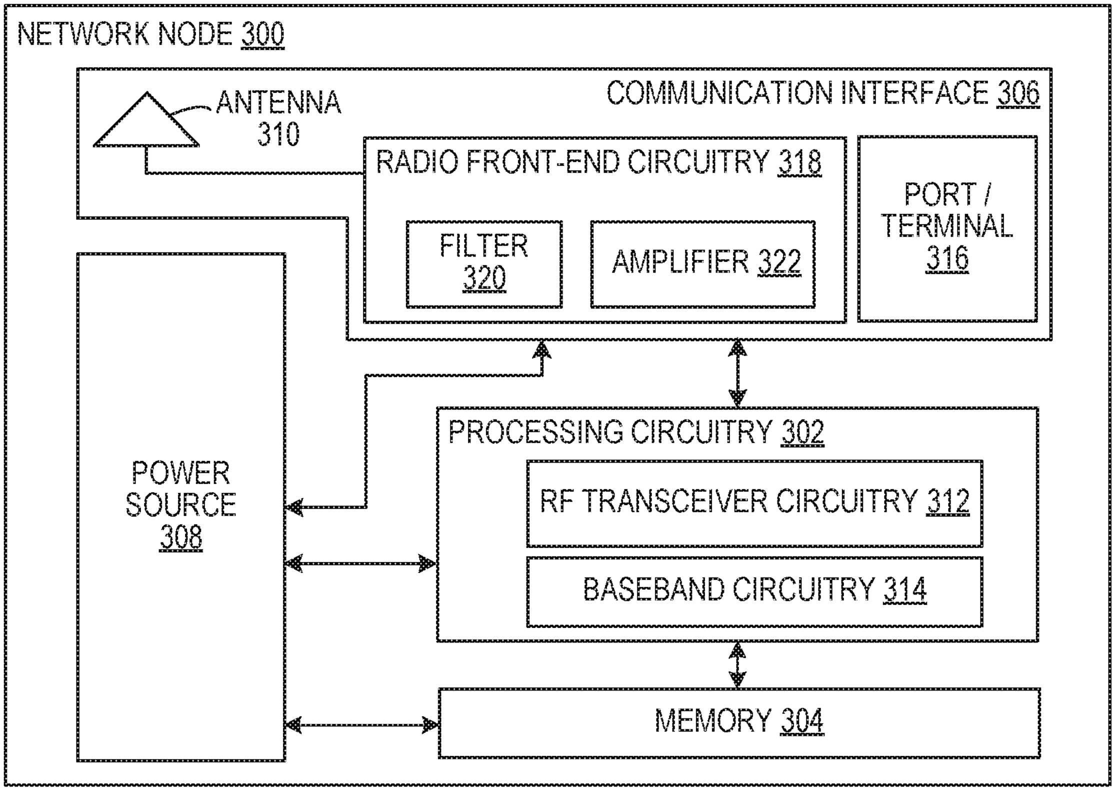
FIG. 3 illustrates an example network node in accordance with some embodiments.

FIG. 3 shows a network node 300 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 300 includes a processing circuitry 302, a memory 304, a communication interface 306, and a power source 308. The network node 300 may be composed of multiple physically separate components (e.g., a NodeB component and a RNC component, or a BTS component and a BSC component, etc.), which may each have their own respective components. In certain scenarios in which the network node 300 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 300 may be configured to support multiple radio access technologies (RATs). In such embodiments, some components may be duplicated (e.g., separate memory 304 for different RATs) and some components may be reused (e.g., a same antenna 310 may be shared by different RATs). The network node 300 may also include multiple sets of the various illustrated components for different wireless technologies integrated into network node 300, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 300.

The processing circuitry 302 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 300 components, such as the memory 304, to provide network node 300 functionality.

In some embodiments, the processing circuitry 302 includes a system on a chip (SOC). In some embodiments, the processing circuitry 302 includes one or more of radio frequency (RF) transceiver circuitry 312 and baseband processing circuitry 314. In some embodiments, the radio frequency (RF) transceiver circuitry 312 and the baseband processing circuitry 314 may be on separate chips (or sets of chips), boards, or units, such as radio units and digital units. In alternative embodiments, part or all of RF transceiver circuitry 312 and baseband processing circuitry 314 may be on the same chip or set of chips, boards, or units.

The memory 304 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 302. The memory 304 may store any suitable instructions, data, or information, including a computer program, software, an application including one or more of logic, rules, code, tables, and/or other instructions capable of being executed by the processing circuitry 302 and utilized by the network node 300. The memory 304 may be used to store any calculations made by the processing circuitry 302 and/or any data received via the communication interface 306. In some embodiments, the processing circuitry 302 and memory 304 is integrated.

The communication interface 306 is used in wired or wireless communication of signaling and/or data between a network node, access network, and/or UE. As illustrated, the communication interface 306 comprises port(s)/terminal(s) 316 to send and receive data, for example to and from a network over a wired connection. The communication interface 306 also includes radio front-end circuitry 318 that may be coupled to, or in certain embodiments a part of, the antenna 310. Radio front-end circuitry 318 comprises filters 320 and amplifiers 322. The radio front-end circuitry 318 may be connected to an antenna 310 and processing circuitry 302. The radio front-end circuitry may be configured to condition signals communicated between antenna 310 and processing circuitry 302. The radio front-end circuitry 318 may receive digital data that is to be sent out to other network nodes or UEs via a wireless connection. The radio front-end circuitry 318 may convert the digital data into a radio signal having the appropriate channel and bandwidth parameters using a combination of filters 320 and/or amplifiers 322. The radio signal may then be transmitted via the antenna 310. Similarly, when receiving data, the antenna 310 may collect radio signals which are then converted into digital data by the radio front-end circuitry 318. The digital data may be passed to the processing circuitry 302. In other embodiments, the communication interface may comprise different components and/or different combinations of components.

In certain alternative embodiments, the network node 300 does not include separate radio front-end circuitry 318, instead, the processing circuitry 302 includes radio front-end circuitry and is connected to the antenna 310. Similarly, in some embodiments, all or some of the RF transceiver circuitry 312 is part of the communication interface 306. In still other embodiments, the communication interface 306 includes one or more ports or terminals 316, the radio front-end circuitry 318, and the RF transceiver circuitry 312, as part of a radio unit (not shown), and the communication interface 306 communicates with the baseband processing circuitry 314, which is part of a digital unit (not shown).

The antenna 310 may include one or more antennas, or antenna arrays, configured to send and/or receive wireless signals. The antenna 310 may be coupled to the radio front-end circuitry 318 and may be any type of antenna capable of transmitting and receiving data and/or signals wirelessly. In certain embodiments, the antenna 310 is separate from the network node 300 and connectable to the network node 300 through an interface or port.

The antenna 310, communication interface 306, and/or the processing circuitry 302 may be configured to perform any receiving operations and/or certain obtaining operations described herein as being performed by the network node. Any information, data and/or signals may be received from a UE, another network node and/or any other network equipment. Similarly, the antenna 310, the communication interface 306, and/or the processing circuitry 302 may be configured to perform any transmitting operations described herein as being performed by the network node. Any information, data and/or signals may be transmitted to a UE, another network node and/or any other network equipment.

The power source 308 provides power to the various components of network node 300 in a form suitable for the respective components (e.g., at a voltage and current level needed for each respective component). The power source 308 may further comprise, or be coupled to, power management circuitry to supply the components of the network node 300 with power for performing the functionality described herein. For example, the network node 300 may be connectable to an external power source (e.g., the power grid, an electricity outlet) via an input circuitry or interface such as an electrical cable, whereby the external power source supplies power to power circuitry of the power source 308. As a further example, the power source 308 may comprise a source of power in the form of a battery or battery pack which is connected to, or integrated in, power circuitry. The battery may provide backup power should the external power source fail.

Embodiments of the network node 300 may include additional components beyond those shown in FIG. 3 for providing certain aspects of the network node's functionality, including any of the functionality described herein and/or any functionality necessary to support the subject matter described herein. For example, the network node 300 may include user interface equipment to allow input of information into the network node 300 and to allow output of information from the network node 300. This may allow a user to perform diagnostic, maintenance, repair, and other administrative functions for the network node 300.

Figure 4:
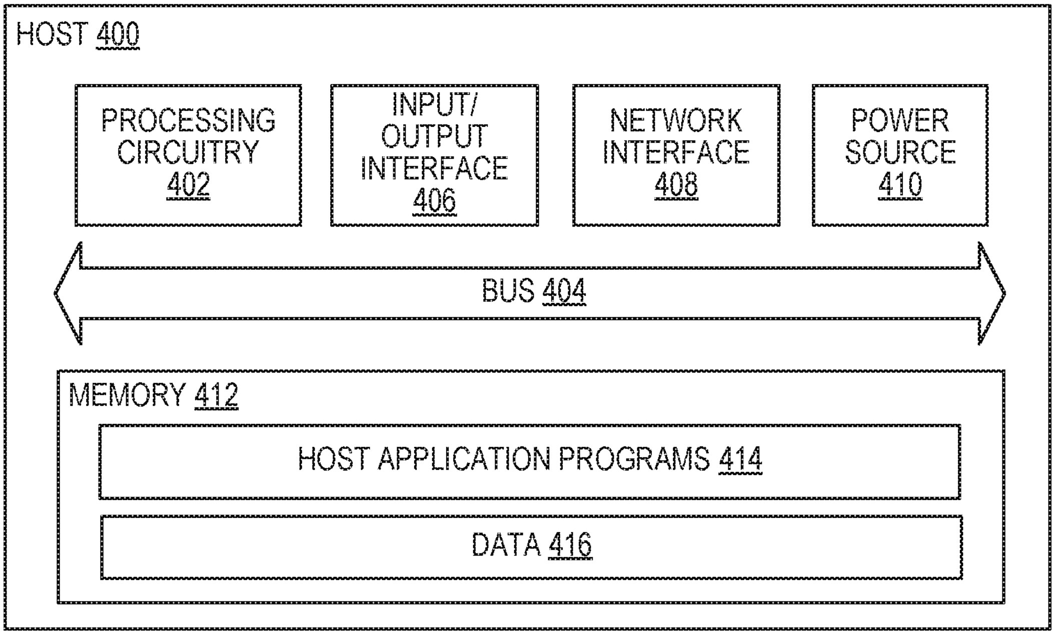
FIG. 4 illustrates a block diagram of a host in accordance with some embodiments.

FIG. 4 is a block diagram of a host 400, which may be an embodiment of the host 116 of FIG. 1, in accordance with various aspects described herein. As used herein, the host 400 may be or comprise various combinations hardware and/or software, including a standalone server, a blade server, a cloud-implemented server, a distributed server, a virtual machine, container, or processing resources in a server farm. The host 400 may provide one or more services to one or more UEs.

The host 400 includes processing circuitry 402 that is operatively coupled via a bus 404 to an input/output interface 406, a network interface 408, a power source 410, and a memory 412. Other components may be included in other embodiments. Features of these components may be substantially similar to those described with respect to the devices of previous figures, such as FIGS. 2 and 3, such that the descriptions thereof are generally applicable to the corresponding components of host 400.

The memory 412 may include one or more computer programs including one or more host application programs 414 and data 416, which may include user data, e.g., data generated by a UE for the host 400 or data generated by the host 400 for a UE. Embodiments of the host 400 may utilize only a subset or all of the components shown. The host application programs 414 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 414 may also provide for user authentication and licensing checks and may periodically report health, routes, and content availability to a central node, such as a device in or on the edge of a core network. Accordingly, the host 400 may select and/or indicate a different host for over-the-top services for a UE. The host application programs 414 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 5:
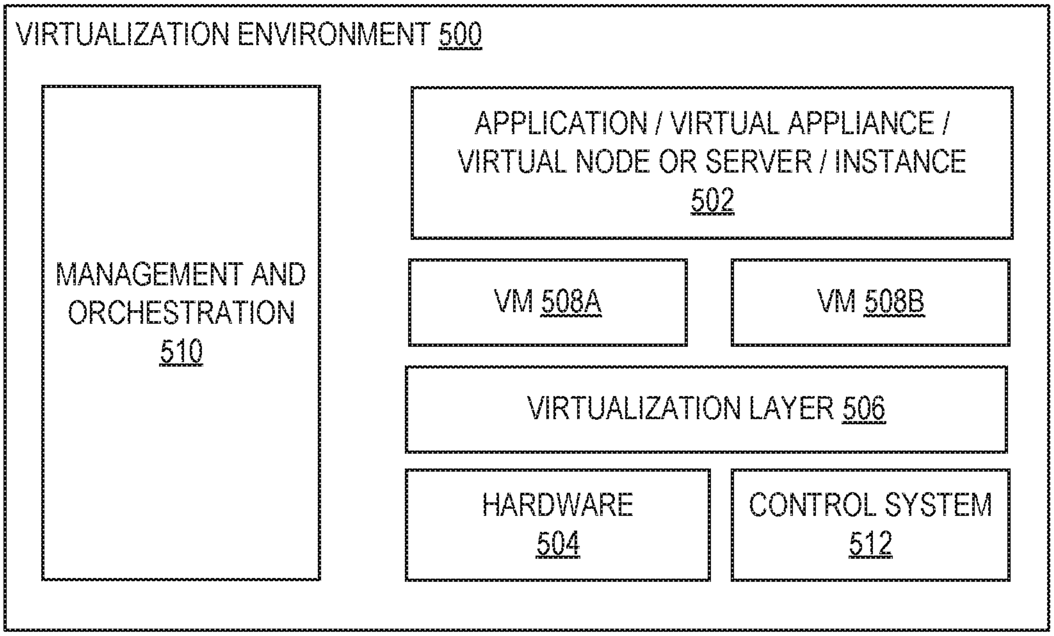
FIG. 5 illustrates a block diagram illustrating a virtualization environment in accordance with some embodiments.

FIG. 5 is a block diagram illustrating a virtualization environment 500 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 500 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 502 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 504 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 506 (also referred to as hypervisors or virtual machine monitors (VMMs)), provide VMs 508*a* and 508*b* (one or more of which may be generally referred to as VMs 508), and/or perform any of the functions, features and/or benefits described in relation with some embodiments described herein. The virtualization layer 506 may present a virtual operating platform that appears like networking hardware to the VMs 508.

The VMs 508 comprise virtual processing, virtual memory, virtual networking or interface and virtual storage, and may be run by a corresponding virtualization layer 506. Different embodiments of the instance of a virtual appliance 502 may be implemented on one or more of VMs 508, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 508 may be a software implementation of a physical machine that runs programs as if they were executing on a physical, non-virtualized machine. Each of the VMs 508, and that part of hardware 504 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 508 on top of the hardware 504 and corresponds to the application 502.

Hardware 504 may be implemented in a standalone network node with generic or specific components. Hardware 504 may implement some functions via virtualization. Alternatively, hardware 504 may be part of a larger cluster of hardware (e.g. such as in a data center or CPE) where many hardware nodes work together and are managed via management and orchestration 510, which, among others, oversees lifecycle management of applications 502. In some embodiments, hardware 504 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 512 which may alternatively be used for communication between hardware nodes and radio units.

Figure 6:
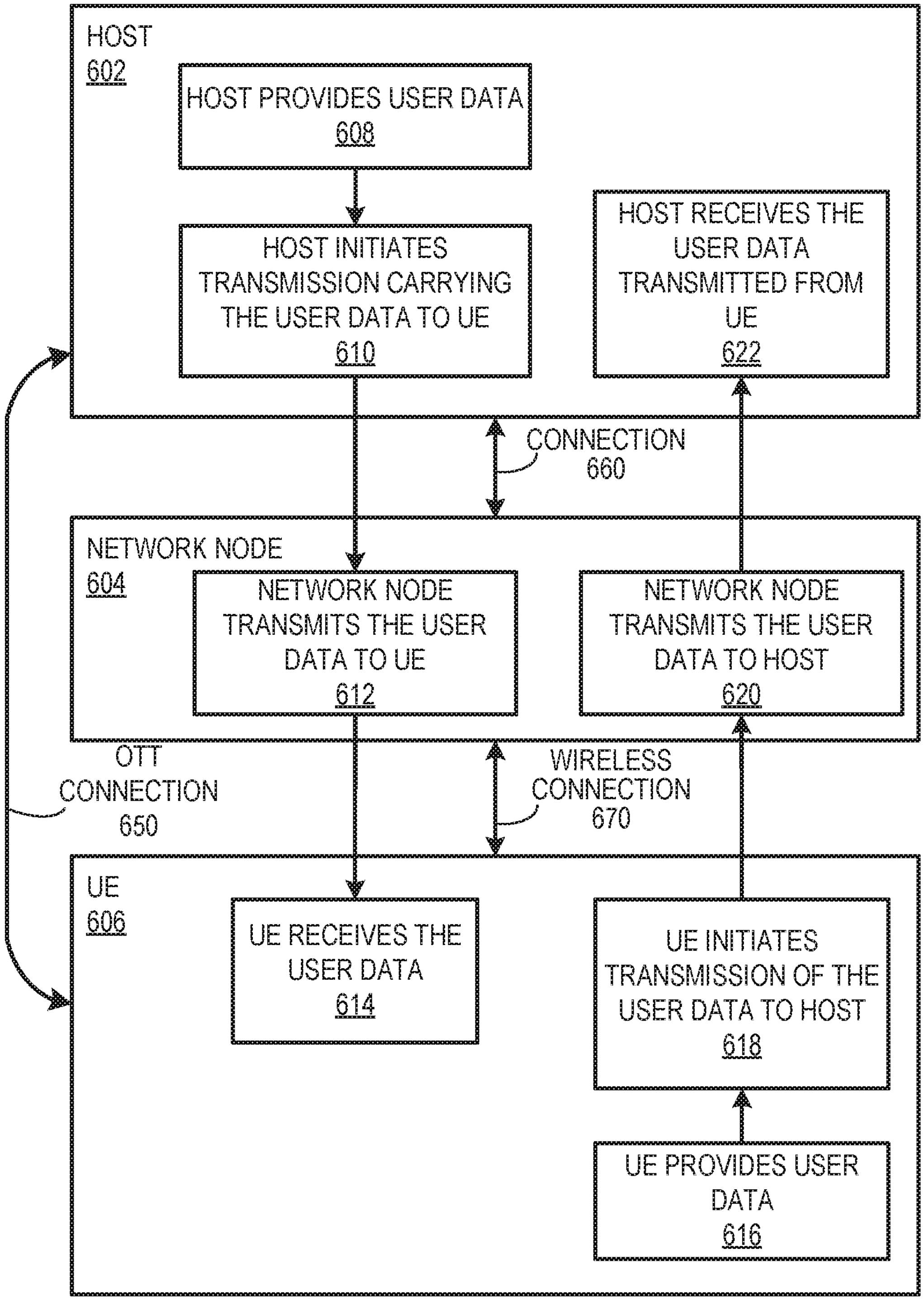
FIG. 6 illustrates a communication diagram of a host communicating via a network node with a user equipment over a partially wireless connection in accordance with some embodiments.

FIG. 6 shows a communication diagram of a host 602 communicating via a network node 604 with a UE 606 over a partially wireless connection in accordance with some embodiments. Example implementations, in accordance with various embodiments, of the UE (such as a UE 112*a* of FIG. 1 and/or UE 200 of FIG. 2), network node (such as network node 110*a* of FIG. 1 and/or network node 300 of FIG. 3), and host (such as host 116 of FIG. 1 and/or host 400 of FIG. 4) discussed in the preceding paragraphs will now be described with reference to FIG. 6.

Like host 400, embodiments of host 602 include hardware, such as a communication interface, processing circuitry, and memory. The host 602 also includes software, which is stored in or accessible by the host 602 and executable by the processing circuitry. The software includes a host application that may be operable to provide a service to a remote user, such as the UE 606 connecting via an over-the-top (OTT) connection 650 extending between the UE 606 and host 602. In providing the service to the remote user, a host application may provide user data which is transmitted using the OTT connection 650.

The network node 604 includes hardware enabling it to communicate with the host 602 and UE 606. The connection 660 may be direct or pass through a core network (like core network 106 of FIG. 1) and/or one or more other intermediate networks, such as one or more public, private, or hosted networks. For example, an intermediate network may be a backbone network or the Internet.

The UE 606 includes hardware and software, which is stored in or accessible by UE 606 and executable by the UE's processing circuitry. The software includes a client application, such as a web browser or operator-specific "app" that may be operable to provide a service to a human or non-human user via UE 606 with the support of the host 602. In the host 602, an executing host application may communicate with the executing client application via the OTT connection 650 terminating at the UE 606 and host 602. In providing the service to the user, the UE's client application may receive request data from the host's host application and provide user data in response to the request data. The OTT connection 650 may transfer both the request data and the user data. The UE's client application may interact with the user to generate the user data that it provides to the host application through the OTT connection 650.

The OTT connection 650 may extend via a connection 660 between the host 602 and the network node 604 and via a wireless connection 670 between the network node 604 and the UE 606 to provide the connection between the host 602 and the UE 606. The connection 660 and wireless connection 670, over which the OTT connection 650 may be provided, have been drawn abstractly to illustrate the communication between the host 602 and the UE 606 via the network node 604, without explicit reference to any intermediary devices and the precise routing of messages via these devices.

As an example of transmitting data via the OTT connection 650, in step 608, the host 602 provides user data, which may be performed by executing a host application. In some embodiments, the user data is associated with a particular human user interacting with the UE 606. In other embodiments, the user data is associated with a UE 606 that shares data with the host 602 without explicit human interaction. In step 610, the host 602 initiates a transmission carrying the user data towards the UE 606. The host 602 may initiate the transmission responsive to a request transmitted by the UE 606. The request may be caused by human interaction with the UE 606 or by operation of the client application executing on the UE 606. The transmission may pass via the network node 604, in accordance with the teachings of the embodiments described throughout this disclosure. Accordingly, in step 612, the network node 604 transmits to the UE 606 the user data that was carried in the transmission that the host 602 initiated, in accordance with the teachings of the embodiments described throughout this disclosure. In step 614, the UE 606 receives the user data carried in the transmission, which may be performed by a client application executed on the UE 606 associated with the host application executed by the host 602.

In some examples, the UE 606 executes a client application which provides user data to the host 602. The user data may be provided in reaction or response to the data received from the host 602. Accordingly, in step 616, the UE 606 may provide user data, which may be performed by executing the client application. In providing the user data, the client application may further consider user input received from the user via an input/output interface of the UE 606. Regardless of the specific manner in which the user data was provided, the UE 606 initiates, in step 618, transmission of the user data towards the host 602 via the network node 604. In step 620, in accordance with the teachings of the embodiments described throughout this disclosure, the network node 604 receives user data from the UE 606 and initiates transmission of the received user data towards the host 602. In step 622, the host 602 receives the user data carried in the transmission initiated by the UE 606.

One or more of the various embodiments improve the performance of OTT services provided to the UE 606 using the OTT connection 650, in which the wireless connection 670 forms the last segment. More precisely, the teachings of these embodiments may improve the energy consumption of UE 606 and thereby provide benefits such as increased battery life.

In an example scenario, factory status information may be collected and analyzed by the host 602. As another example, the host 602 may process audio and video data which may have been retrieved from a UE for use in creating maps. As another example, the host 602 may collect and analyze real-time data to assist in controlling vehicle congestion (e.g., controlling traffic lights). As another example, the host 602 may store surveillance video uploaded by a UE. As another example, the host 602 may store or control access to media content such as video, audio, VR or AR which it can broadcast, multicast or unicast to UEs. As other examples, the host 602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 650 between the host 602 and UE 606, in response to variations in the measurement results. The measurement procedure and/or the network functionality for reconfiguring the OTT connection may be implemented in software and hardware of the host 602 and/or UE 606. In some embodiments, sensors (not shown) may be deployed in or in association with other devices through which the OTT connection 650 passes; the sensors may participate in the measurement procedure by supplying values of the monitored quantities exemplified above, or supplying values of other physical quantities from which software may compute or estimate the monitored quantities. The reconfiguring of the OTT connection 650 may include message format, retransmission settings, preferred routing etc.; the reconfiguring need not directly alter the operation of the network node 604. Such procedures and functionalities may be known and practiced in the art. In certain embodiments, measurements may involve proprietary UE signaling that facilitates measurements of throughput, propagation times, latency and the like, by the host 602. The measurements may be implemented in that software causes messages to be transmitted, in particular empty or 'dummy' messages, using the OTT connection 650 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

XR and cloud gaming applications in 5G NR networks require high data transfer rate and low latency. These low-latency applications require bounded latency, although not necessarily ultra-low latency. The end-to-end latency budget may be in the range of 20-80 ms, which is distributed across several types of latency among different layers in a communication channel, including application processing latency, transport latency, and radio link latency, etc. For these applications, using short transmission time intervals (TTIs) or mini-slots targeting ultra-low latency may not be effective in reducing the latency.

Figure 7:
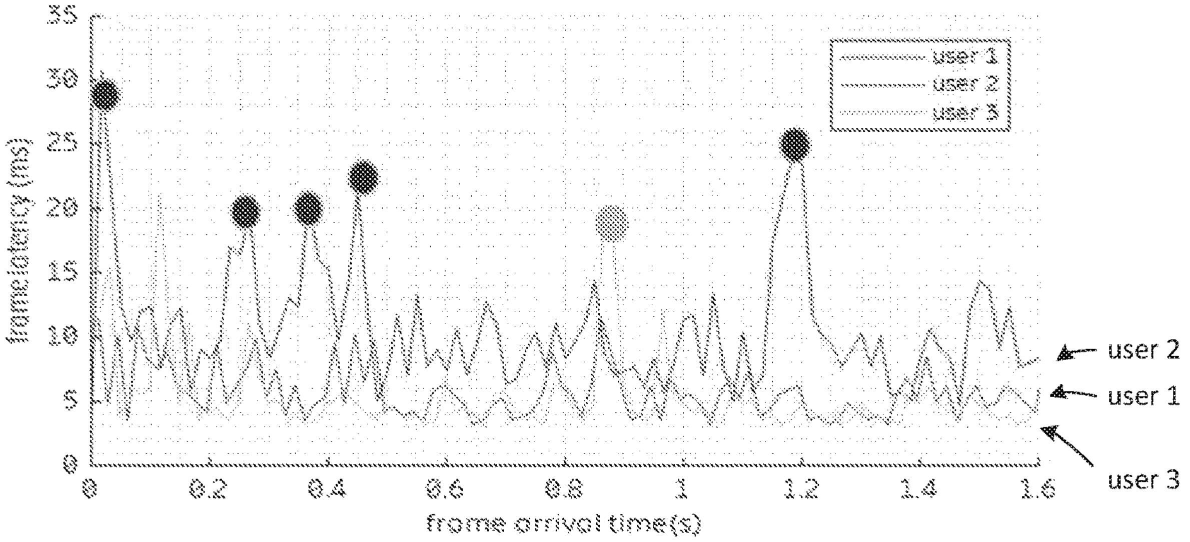
FIG. 7 illustrates an example of frame latency measured over a radio access network.

FIG. 7 shows an example of frame latency measured over a radio access network (RAN). The frame latency shown in FIG. 7 does not include application and core network latencies. FIG. 7 shows frame latency measurements for three users. For all three users, there are frame latency spikes in RAN. Latency spikes represent a significant increase in latency. Latency spikes may be caused by a variety of reasons, including queuing delay, time-varying radio environments, and time-varying frame sizes, etc. Tools that can help eliminating or reducing latency spikes are beneficial to enable better 5G support for XR and cloud gaming applications.

In addition to the bounded latency requirements, XR and cloud gaming applications require a high data transmission rate because gaming applications generate video frames having large frame sizes. A typical gaming application frame size may range from tens of kilobytes to hundreds of kilobytes. The frame arrival rates may be about 60 or 120 frames per second (fps). As an example, a frame size of about 100 kilobytes and a frame arrival rate of about 120 fps can lead to a rate requirement of about 95.8 Mbps.

Figure 8:
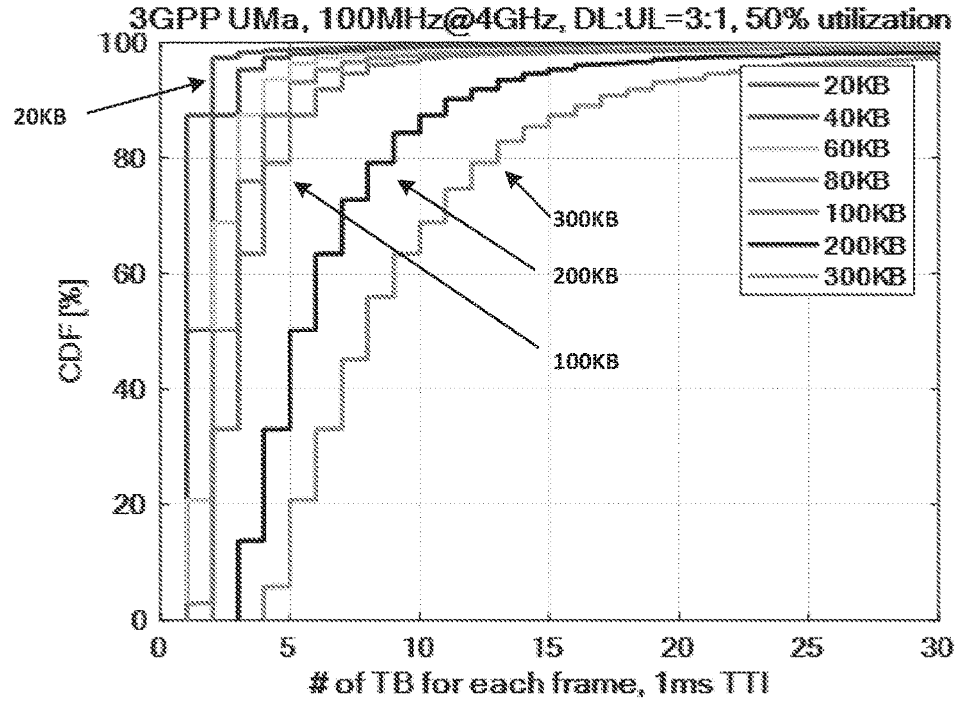
FIG. 8 illustrates an example of cumulative distribution functions of the number of transport blocks required to deliver a video frame.

In RAN, a large video frame is usually fragmented into smaller IP packets and transmitted as several transport blocks (TBs) over several TTIs. FIG. 8 shows an example of the cumulative distribution functions of the number of transport blocks required to deliver a video frame with a size ranging from about 20 KB to about 300 KB. For example, FIG. 8 shows that for delivering the frames with a size of about 100 KB each, the median number of the needed TBs is about 5.

It is increasingly expected to deliver XR games via HMDs instead of smartphones. The power considerations for HMDs are different from those of smartphones. For example, the power dissipation of AR glasses can be significantly lower than that of a smartphone because they are expected to be worn by the user for a long period of time. A pair of AR glasses may have a built-in 5G modem providing 5G connectivity, or it can be connected via USB, Bluetooth, or Wi-Fi to a smartphone having 5G connectivity. In either case, the 5G network is desired to transmit and receive large-packet-sized XR application data with low latency. Processing such large-packet-sized XR application data may require significant power consumption of a UE.

In addition, for example, the AR computation can be split between the UEs (e.g., AR glasses) and edge servers. The computation split can reduce the overall power consumption on the UE if the resulting traffic does not increase the UE power consumption significantly.

Power consumption of a UE is also important when the UE is a smartphone. For example, in cloud gaming applications, the UE is expected to be a smartphone or a tablet. A more efficient power consumption, which means a longer battery life of a UE, produces a better cloud gaming experience. As such, power consumption of the UE is an important factor in XR and cloud gaming applications enabled by a 5G network.

The DRX procedure specified in the 3GPP specifications for NR and LTE is also an effective power-saving mechanism. The DRX procedure allows a UE to save battery power by monitoring downlink (DL) control channel less frequently and by going to sleep when there is no packet activity for the UE. DRX can be applied when the UE is in both RRC idle mode (RRC_IDLE) and RRC connected mode (RRC_CONNECTED).

Figure 9:
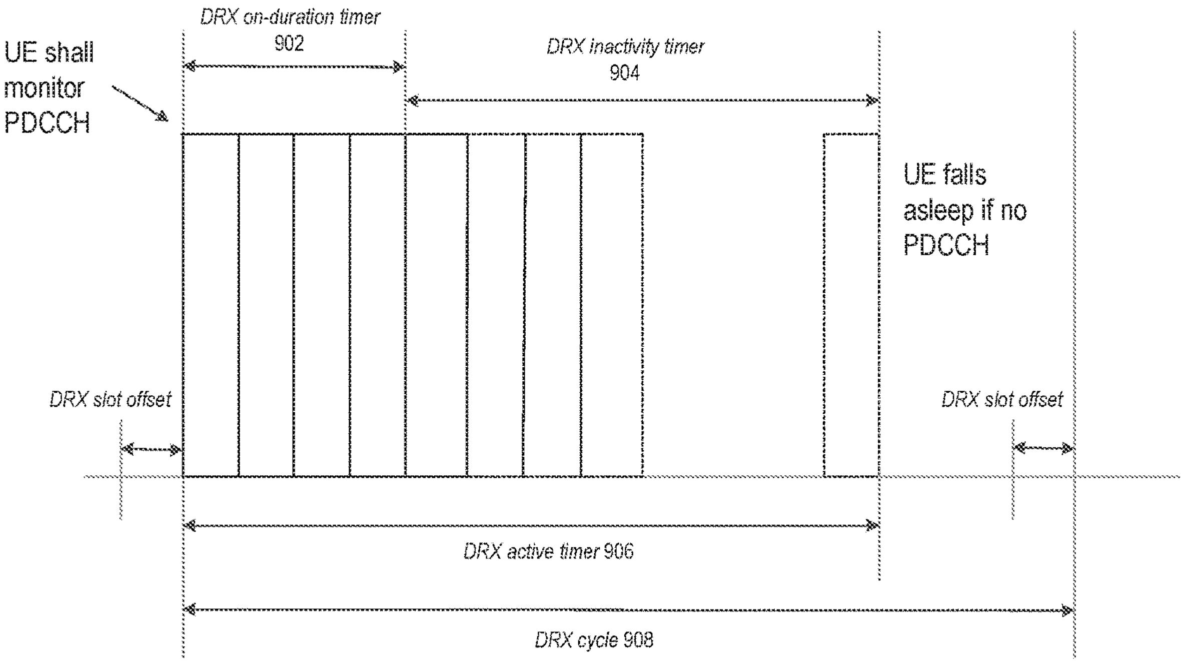
FIG. 9 illustrates a simplified diagram illustrating an example DRX operation.

FIG. 9 shows a simplified diagram of an example DRX operation. In FIG. 9, several DRX parameters are shown, including a DRX on-duration timer 902, a DRX inactivity timer 904, and a DRX active timer 906. These DRX parameters are configurable via RRC signaling. The DRX on-duration timer 902 and the DRX inactivity timer 904 have fixed lengths. The DRX active timer 906 has a variable length, which is determined based on scheduling decisions and whether decoding is successful. The DRX operation mode, which includes short DRX and long DRX, is also configurable via RRC signaling. At any given time, DRX on-duration timer 902 has a fixed value regardless of which DRX operation mode the UE is in. If the UE successfully decodes a PDCCH, the UE remains connected and actively monitoring for downlink data. At the same time, the UE starts the DRX inactivity timer 904. When the timer 904 expires, the UE switches back to DRX operation. If no downlink control indicator (DCI) is received, indicating that no data packet is transmitted, the UE switches directly to sleep mode until the start of the next DRX cycle 908. The DRX on-duration (represented by the on-duration timer 902) is a periodic phase which occurs at the start of every DRX cycle 908.

DRX operation helps reducing the power consumption of a UE by not monitoring the downlink during certain time periods. The DRX framework includes two different DRX periods: a short DRX cycle and a long DRX cycle. In the short DRX cycle, the UE monitors the DL more often than when the UE is in the long DRX cycle. If the short DRX cycle is configured, the UE enters the short DRX cycle after the DRX inactivity timer expires, which means there is no downlink or uplink transmissions for a period of time. If the short DRX cycle is not configured, the UE enters the long DRX cycle after the DRX inactivity timer expires. In some examples, if the short DRX cycle is configured, the UE enters the long DRX cycle after the short DRX cycle timer expires. The short DRX cycle timer can be configured by the drx-ShortCycleTimer parameter described below.

As an example, DRX can be controlled by using the following parameters:

- drx-on DurationTimer: the duration at the beginning of a DRX Cycle;
- drx-SlotOffset: the delay before starting the drx-onDuration Timer;
- drx-InactivityTimer: the duration after the PDCCH occasion in which a PDCCH indicates a new UL or DL transmission for the MAC entity;
- drx-RetransmissionTimerDL (per DL HARQ process except for the broadcast process): the maximum duration until a DL retransmission is received;
- drx-RetransmissionTimerUL (per UL HARQ process): the maximum duration until a grant for UL retransmission is received;
- drx-LongCycleStartOffset: the Long DRX cycle and drx-StartOffset which defines the subframe where the Long and Short DRX Cycle starts;
- drx-ShortCycle (optional): the Short DRX cycle;
- drx-ShortCycleTimer (optional): the duration the UE shall follow the Short DRX cycle;
- drx-HARQ-RTT-TimerDL (per DL HARQ process except for the broadcast process): the minimum duration before a DL assignment for HARQ retransmission is expected by the MAC entity;
- drx-HARQ-RTT-TimerUL (per UL HARQ process): the minimum duration before a UL HARQ retransmission grant is expected by the MAC entity;
- ps-Wakeup (optional): the configuration to start associated drx-onDurationTimer in case DCP is monitored but not detected;
- ps-Periodic_CSI_Transmit (optional): the configuration to report periodic CSI during the time duration indicated by drx-onDurationTimer in case DCP is configured but associated drx-onDurationTimer is not started; and/or
- ps-TransmitPeriodicL1-RSRP (optional): the configuration to transmit periodic L1-RSRP report(s) during the time duration indicated by drx-onDurationTimer in case DCP is configured but associated drx-onDuration-Timer is not started.

In some embodiments, parameter drx-onDuration Timer may be configured according to the following information element:

```
CHOICE {
  subMilliSeconds          INTEGER (1..31),
  milliSeconds             ENUMERATED {ms1, ms2, ms3, ms4,
  ms5, ms6, ms8, ms10, ms20, ms30, ms40, ms50, ms60, ms80, ms100,
  ms200, ms300, ms400, ms500, ms600, ms800, ms1000, ms1200,
  ms1600, spare8, spare7, spare6, spare5, spare4, spare3, spare2, spare1},
}.
```

In some embodiments, parameter drx-SlotOffset may be configured according to the following information element: INTEGER (0 . . . 31).

In some embodiments, parameter drx-InactivityTimer may be configured according to the following information element:

```
ENUMERATED {ms0, ms1, ms2, ms3, ms4, ms5, ms6, ms8, ms10,
ms20, ms30, ms40, ms50, ms60, ms80, ms100, ms200, ms300, ms500,
ms750, ms1280, ms1920, ms2560, spare9, spare8, spare7, spare6, spare5,
spare4, spare3, spare2, spare1}.
```

In some embodiments, parameters drx-HARQ-RTT-TimerDL and drx-HARQ-RTT-TimerUL may be configured according to the following information element: INTEGER (0 . . . 56).

In some embodiments, parameter drx-Retransmission-TimerDL may be configured according to the following information element:

ENUMERATED {sl0, sl1, sl2, sl4, sl6, sl8, sl16, sl24, sl33, sl40, sl64, sl80, sl96, sl112, sl128, sl160, sl320, spare15, spare14, spare13, spare12, spare11, spare10, spare9, spare8, spare7, spare6, spare5, spare4, spare3, spare2, spare1}.

In some embodiments, parameter drx-RetransmissionTimerUL may be configured according to the following information element:

ENUMERATED {sl0, sl1, sl2, sl4, sl6, sl8, sl16, sl24, sl33, sl40, sl64, sl80, sl96, sl112, sl128, sl160, sl320, spare15, spare14, spare13, spare12, spare11, spare10, spare9, spare8, spare7, spare6, spare5, spare4, spare3, spare2, spare1}.

In some embodiments, parameter drx-LongCycleStartOffset may be configured according to the following information element:

```
Choice {
  ms10        INTEGER(0..9),
  ms20        INTEGER(0..19),
  ms32        INTEGER(0..31),
  ms40        INTEGER(0..39),
  ms60        INTEGER(0..59),
  ms64        INTEGER(0..63),
  ms70        INTEGER(0..69),
  ms80        INTEGER(0..79),
  ms128       INTEGER(0..127),
  ms160       INTEGER(0..159),
  ms256       INTEGER(0..255),
  ms320       INTEGER(0..319),
  ms512       INTEGER(0..511),
  ms640       INTEGER(0..639),
  ms1024      INTEGER(0..1023),
  ms1280      INTEGER(0..1279),
  ms2048      INTEGER(0..2047),
  ms2560      INTEGER(0..2559),
  ms5120      INTEGER(0..5119),
  ms10240     INTEGER(0..10239)
}.
```

In some embodiments, parameter drx-ShortCycle may be configured according to the following information element:

ENUMERATED {ms2, ms3, ms4, ms5, ms6, ms7, ms8, ms10, ms14, ms16, ms20, ms30, ms32, ms35, ms40, ms64, ms80, ms128, ms160, ms256, ms320, ms512, ms640, spare9, spare8, spare7, spare6, spare5, spare4, spare3, spare2, spare1}.

In some embodiments, parameter drx-ShortCycleTimer may be configured according to the following information element:

INTEGER (1 . . . 16).

During a short DRX cycle, the UE should monitor the DL following the equation [1] below:

$$[(SFN \times 10) + \text{subframe number}] \text{ modulo } (drx\text{-}ShortCycle) = (drx\text{-}StartOffset) \text{ modulo } (drx\text{-}ShortCycle) \quad [1]$$

During a long DRX cycle, the UE should monitor the DL following the equation [2] below:

$$[(SFN \times 10) + \text{subframe number}] \text{ modulo } (drx\text{-}LongCycle) = drx\text{-}StartOffset \quad [2]$$

In both equations [1] and [2], SFN denotes System Frame Number.

XR and cloud gaming applications in 5G NR networks requires transferring large application data units (ADUs) in one or more IP packets. All the IP packets need to be received by the receiver within a defined latency bound, e.g., about 30 ms. Bounded latency is determined based on the application and the content type. For XR gaming applications, for instance, the latency bound varies between about 10 ms to about 50 ms.

This bounded latency and the requirement of transmitting large ADUs in several IP packets often result in less or even no opportunity for retransmission. Similarly, with pose traffic when small size and periodic ADUs need to reach the receiver within a bounded latency, e.g., 10 ms, the retransmission opportunities may also be limited.

Figure 10:
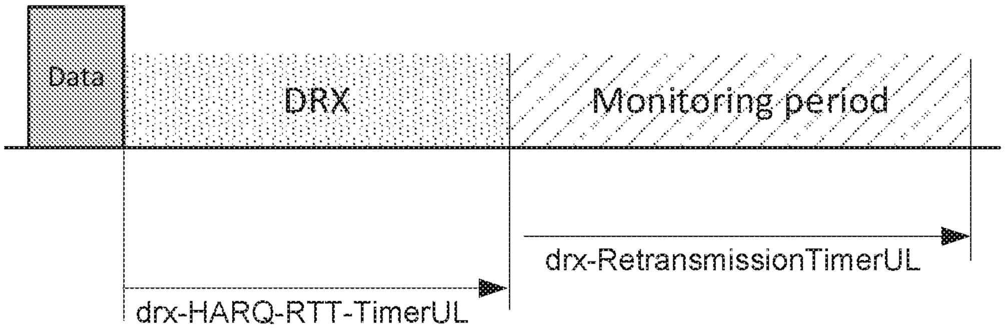
FIG. 10 illustrates an example of a monitoring period and the associated DRX retransmission timers for uplink.
Figure 11:
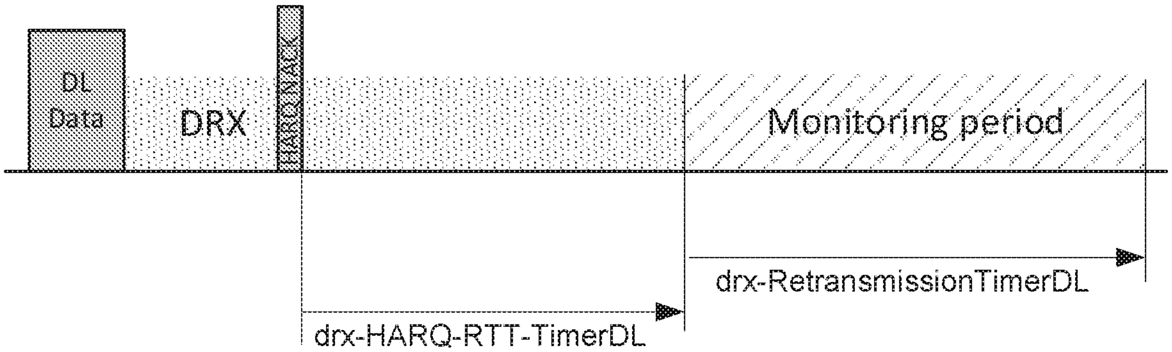
FIG. 11 illustrates an example of a monitoring period and the associated DRX retransmission timers for downlink.

Current specifications mandate the UE to listen for retransmission during monitoring periods. This is controlled by DRX parameters drx-HARQ-RTT-TimerUL and drx-Retransmission TimerUL for uplink, drx-HARQ-RTT-TimerDL and drx- and RetransmissionTimerDL for downlink. FIGS. 10 and 11 illustrate examples of the monitoring period and the associated DRX retransmission timers. FIG. 10 illustrates an example where a UE is monitoring PDCCH during a monitoring period when a retransmission is requested by the network for uplink transmission. FIG. 11 illustrates a similar situation when a retransmission is requested by the UE for downlink transmission. A monitoring period results in an increase in power consumption of the UE. However, the monitoring period should not be needed when the UE knows that there will not be a retransmission.

This knowledge of whether there will be any retransmissions, or the number of retransmissions remaining, can also be used to limit the number of monitoring periods required for the UE to monitor the downlink.

In various embodiments, the devices, instruments, systems, and methods described in the present disclosure can be used to reduce, modify, or eliminate the monitoring period for retransmissions associated to DRX in the UE. In some embodiments, the monitoring period can be eliminated or reduced when it is known that there will not be retransmissions due to the limited latency or excessive delay.

Some of the embodiments of the present disclosure are described herein. Although DRX retransmission timers drx-HARQ-RTT-TimerUL and drx-RetransmissionTimerUL are used in the description herein for illustration, it is understood that the same or similar descriptions would also apply to drx-HARQ-RTT-TimerDL and drx-RetransmissionTimerDL timers.

In some embodiments, the network node can configure the maximum number of retransmissions that the UE will monitor. This maximum number can be provided separately for downlink and for uplink. The information can be provided via RRC as part of the DRX configuration indicated to the UE. In other embodiments, the RRC can also indicate whether the DRX retransmission timers are being used or not. Similarly, this indication can also be provided separately for downlink and for uplink. If it is indicated that DRX retransmission timers are not being used, then the UE need not monitor the PDCCH for retransmissions during the monitoring period. Indicating that the DRX retransmission timers are not being used is sometimes equivalent to indicating that the maximum number of retransmissions is zero. The information that DRX retransmission timers are not being used can also be indicated by the absence of a corresponding information element.

When the UE receives the indication of the maximum number of retransmissions or the information of whether DRX retransmission timers are being used, the UE can limit, in the corresponding HARQ process, the number of times it will start or re-start the corresponding DRX retransmission timers. The DRX retransmission timers include, for example, drx-HARQ-RTT-TimerUL and drx-RetransmissionTimerUL for uplink retransmissions, or drx-HARQ-RTT-TimerDL and drx-RetransmissionTimerDL for downlink retransmissions. In some embodiments, the UE can omit a potential NACK (negative acknowledgment) transmission, as depicted in FIG. 11, when the maximum number of retransmissions by the network node has already been reached for the downlink.

Figure 12:
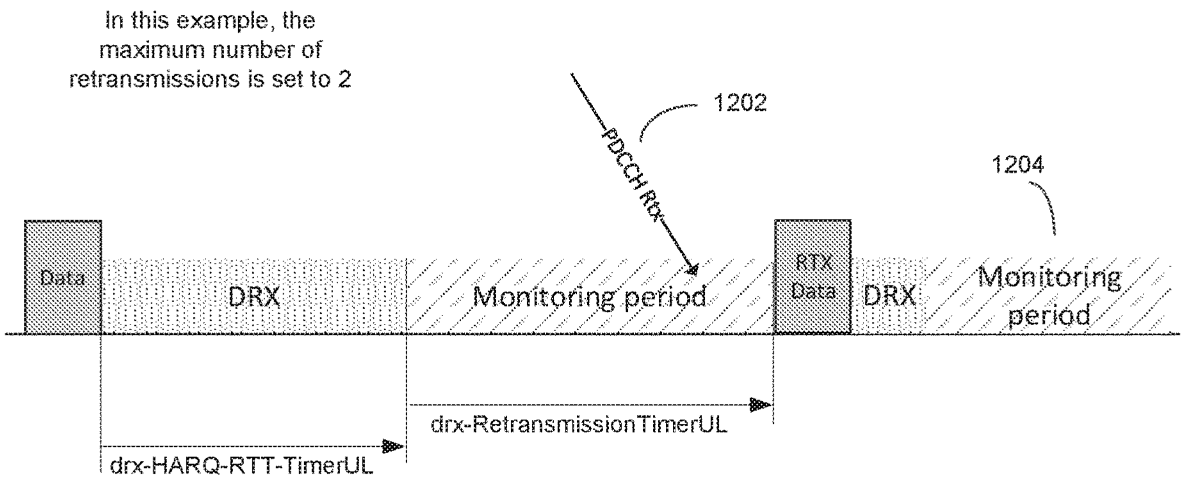
FIG. 12 illustrates an example signal diagram when the maximum number of retransmissions is set to two in accordance with some embodiments.

In some embodiments, this mechanism can be used when the network node uses configured grants to perform downlink or uplink transmissions. FIG. 12 illustrates an example signal diagram when the maximum number of retransmissions is set to two for downlink. For configured grants, the UE does not expect to receive a PDCCH. The UE has information about the slots in which the UE can transmit or when downlink data may be received. In the embodiment illustrated in FIG. 12, RRC configures the UE to start the corresponding retransmission timers at most two times. If the network node has not transmitted a PDCCH to schedule a retransmission, the second monitoring period 1204 would not have been started. However, in this example, there is one PDCCH retransmission 1202 scheduled, which triggers restarting the retransmission timers again according to the already specified procedures. On the other hand, the retransmission timers would not be re-started a third time regardless of whether the network node would transmit a PDCCH to schedule a retransmission.

Figure 13:
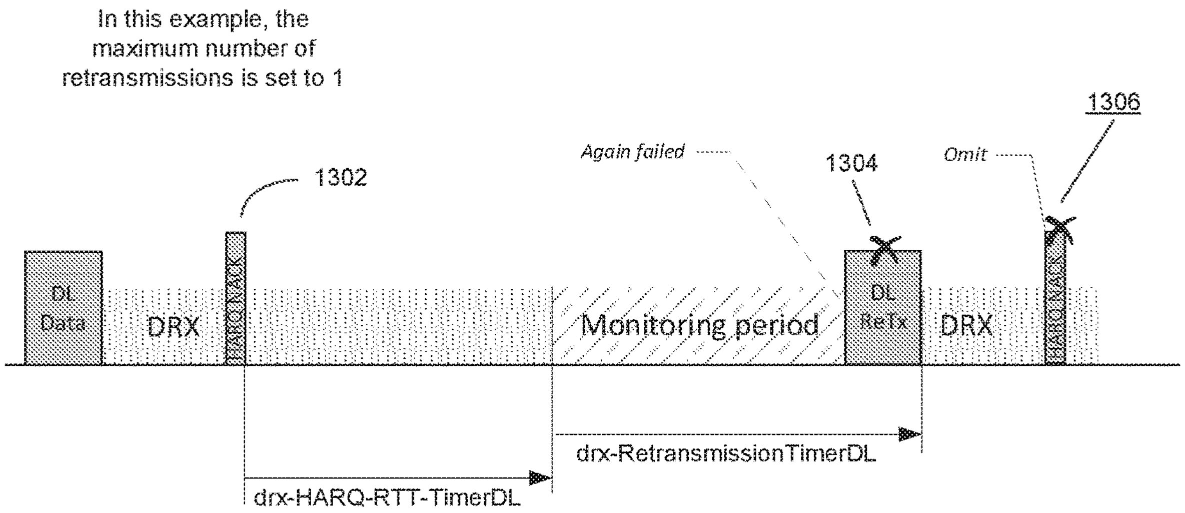
FIG. 13 illustrates an example signal diagram when the maximum number of retransmissions is set to one in accordance with some embodiments.

FIG. 13 illustrates an example signal diagram when the maximum number of retransmissions is set to one for downlink. In this embodiment, the UE has failed to receive the first downlink transmission (not shown in FIG. 13) and transmits a HARQ NACK 1302. Thereafter, the network node retransmits the data, which again failed to be correctly received by the UE, as illustrated by failed retransmission 1304. In this embodiment, since the UE knows that the network node will not retransmit the data more than once, the UE can omit starting the associated DRX retransmission timers and can even omit the HARQ NACK transmission 1306. In some embodiments, the omission of a potential HARQ NACK by the UE is only allowed if the network node has configured or allowed for such omission.

The DRX retransmission timer sometimes may extend beyond its configured length. This may happen when the UE is receiving multiple uplink grants. In other embodiments, in addition to configuring the above-mentioned DRX retransmission timers, the UE is additionally configured with another parameter, e.g., a maximum monitoring time. For example, the UE may be configured with a DRX retransmission timer of 10 ms, and the maximum monitoring time of 15 ms. In this situation, if the DRX retransmission timer is extended beyond 15 ms, the UE stops the DRX retransmission timers after the maximum monitoring time expires. This is to ensure that the bounded latency of the channel is respected.

In some embodiments, the maximum number of retransmissions can also be configured by parameters associated with the UE battery status. In this situation, a UE is allowed not to monitor grants for retransmission if the battery level at the UE is below a threshold. This can be configured by the network node. In this way, the UE can choose the monitoring window for retransmission grant based on its own UE battery level. This will provide the UE with more adaptivity and flexibility in managing its power consumption level.

Figure 14:
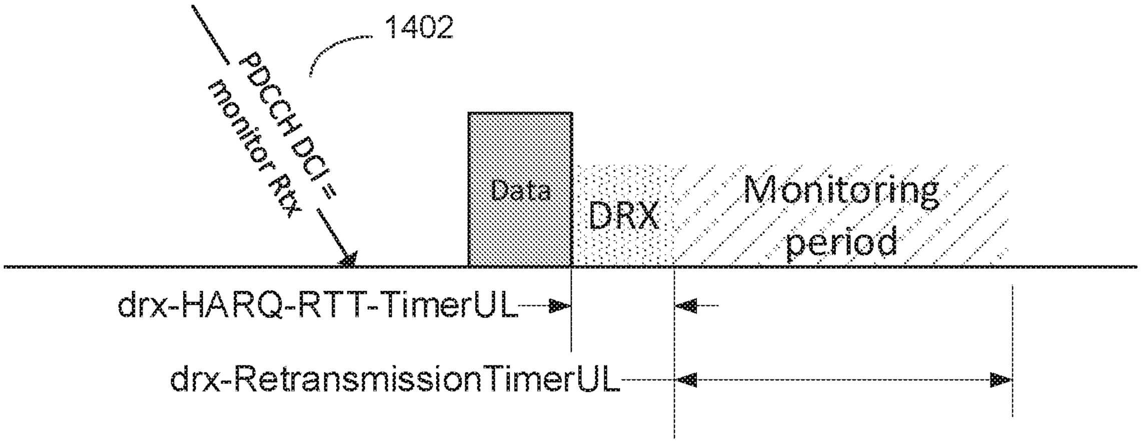
FIG. 14 illustrates an example signal diagram where the Downlink Control Information (DCI) in Physical Dedicated Control Channel (PDCCH) is used to configure the parameters in accordance with some embodiments.

In some embodiments, both RRC signaling and L1/L2 signaling, e.g., DCI in PDCCH or a MAC-CE, may be used to configure the parameters. It can be indicated in PDCCH DCI whether the UE should monitor the retransmissions, e.g., whether the UE should start the associated DRX retransmission timers. FIG. 14 illustrates an example signal diagram where the DCI in PDCCH is used to configure the parameters. In this embodiment, the RRC configures the UE with one retransmission. When the PDCCH 1402 is transmitted to the UE, the DCI indicates to the UE to monitor the retransmissions only once, that is, to start only once the drx-HARQ-RTT-TimerUL and drx-RetransmissionTimerUL timers. In some embodiments, if it is indicated in the DCI that the UE should not monitor any retransmissions, the UE does not start the drx-HARQ-RTT-TimerUL and drx-RetransmissionTimerUL timers. In such case, no retransmissions will happen, thereby saving the UE's power consumption.

In some embodiments, the RRC can configure a set of maximum values using, for example, an array of values. An index in the DCI can indicate which value in the array is currently being used. In this way, the network node can select a suitable value based on the current link quality. The network node can select a higher value when the link quality degrades, and a lower value, including a zero value, when the link quality improves. In some embodiments, if only one value of the maximum number of retransmissions is configured, the index in the DCI is used to enable or disable whether the UE needs to monitor retransmissions. If more than one value of the maximum number of retransmissions are configured, the DCI index indicates which value needs to be used by the UE. Besides using the DCI index, the determination of which value should be used by the UE can also be made based on a certain threshold. For example, if the link quality is above a certain threshold, which can be determined via standardization documents, a first value can be used by the UE and the network node. When the link quality falls below a certain threshold, a second value can be used.

In some embodiments, the maximum number of retransmissions can be configured via MAC-CE. In such case, the configured maximum number is valid until the MAC-CE further configures another maximum number. In some embodiments, the maximum number of retransmissions is valid while a certain condition is met. The condition can be, for example, when a validity timer is on as long as current link quality stays within a certain threshold. Both the validity timer and the threshold can be preconfigured via RRC or carried by the MAC-CE.

Configuring the maximum number of retransmissions via MAC-CE is useful when the network node uses configured grants to perform downlink or uplink transmissions, specifically for configured grant (CG) Type 2 in uplink. For CG Type 2, the network node activates the configured grant using PDCCH. After that, the UE activates the CG configuration and, as described above, the UE performs transmissions or receptions in configured slots.

Figure 15:
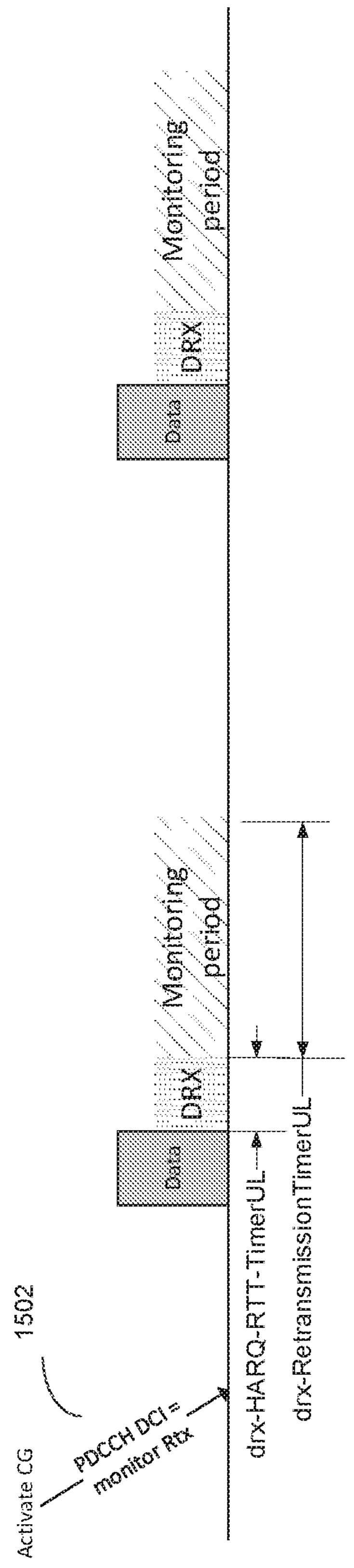
FIG. 15 illustrates an example signal diagram where PDCCH is used to configure the parameters per each transmission in accordance with some embodiments.

FIG. 15 illustrates an example signal diagram where PDCCH is used to configure the parameters per each transmission. In some embodiments, as illustrated in FIG. 15, only DCI indication in PDCCH is used. RRC does not need to indicate the maximum number of retransmissions because PDCCH 1502 indicates per each transmission whether the UE needs to start the corresponding retransmission timers. This embodiment is useful when the network node utilizes dynamic grant, because in dynamic grant, every downlink and uplink transmission are preceded by a PDCCH transmission from the network node.

Figure 16:
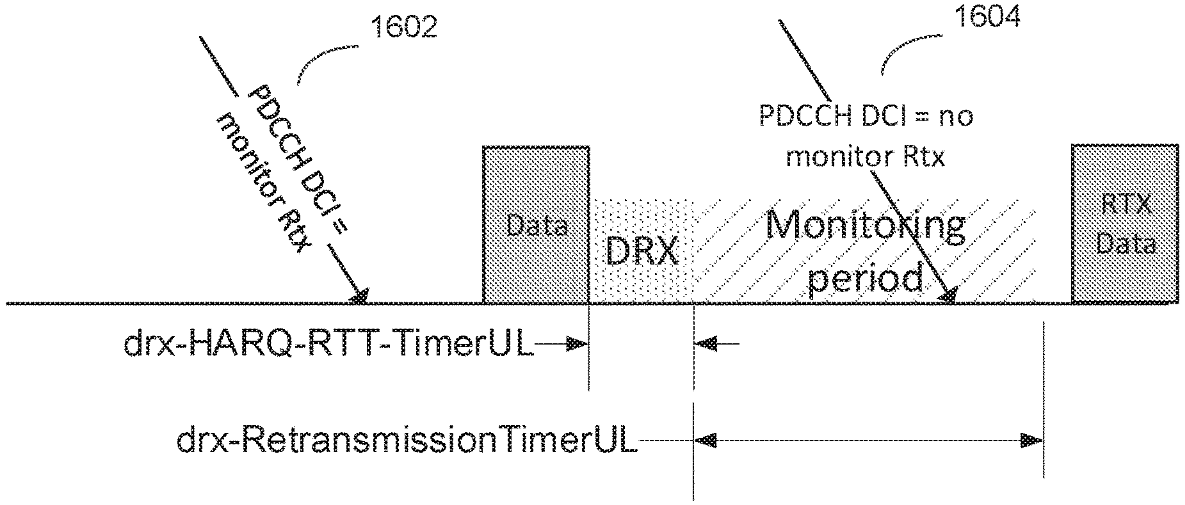
FIG. 16 illustrates an example signal diagram where a new PDCCH is used to indicate a retransmission in accordance with some embodiments.

Using PDCCH to configure retransmission parameters per each transmission can also be applied when configured grant is used in downlink or uplink CG Type 2. FIG. 16 illustrates an example signal diagram where a new PDCCH is used to indicate a retransmission. In some embodiments, as illustrated in FIG. 16, when CG is activated, the DCI in PDCCH 1602 indicates if the associated DRX retransmission timer should be started. If the DRX retransmission timer is started and the UE is monitoring the downlink, and if a new PDCCH 1604 is received to schedule retransmissions, the DCI may also indicate whether the UE should restart the DRX retransmission timers again to monitor for a possible subsequent retransmission.

Figure 17:
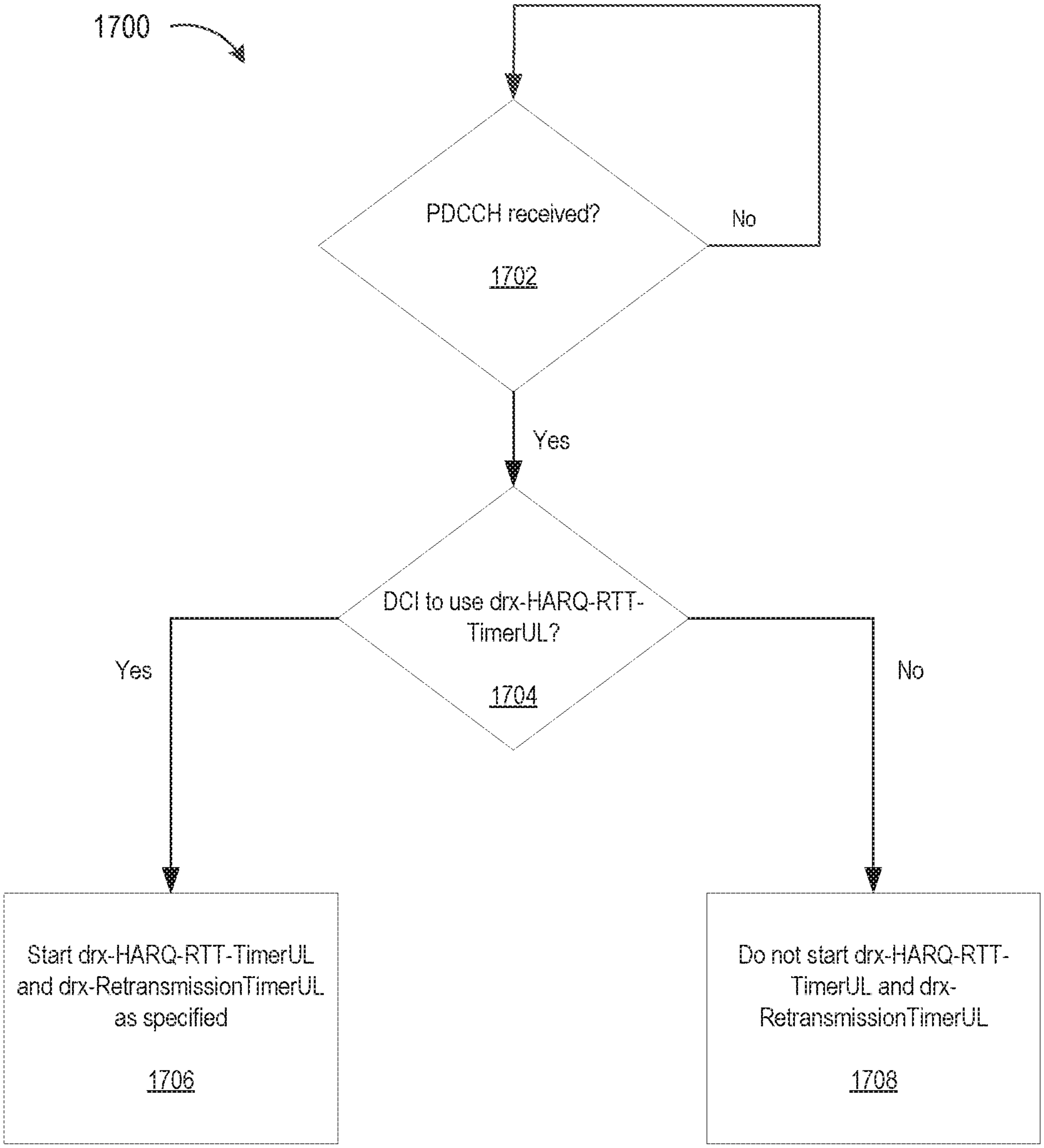
FIG. 17 is an example flowchart illustrating a method of monitoring PDCCH to determine whether to start retransmission timers in accordance with some embodiments.

FIG. 17 is an example flowchart illustrating method 1700 performed by a UE to monitor PDCCH to determine whether to start the corresponding DRX retransmission timers. In step 1702, the UE monitors the uplink to see if a PDCCH is received from the network node. If a PDCCH is not received, the UE continues to monitor the uplink until a PDCCH is received. If a PDCCH is received, the method 1700 proceeds to step 1704. In step 1704, the UE checks the DCI in the PDCCH to see if it indicates whether drx-HARQ-RTT-TimerUL should be started. If yes, method 1700 proceeds to step 1706, in which the UE starts drx-HARQ-RTT-TimerUL and drx-RetransmissionTimerUL. If no, the UE does not start the corresponding retransmission timers as specified in step 1708.

In some embodiments, an additional bitfield in the DCI can be configured such that the additional bitfield can indicate whether the associated DRX retransmission timer needs to be started. For example, when configuring the grant, an additional bitfield in a scheduling DCI can indicate if the UE should start the associated timers. The DCI formats are 0-0, 1-0, 0-1. 1-1, 0-2 and 1-2. If the UE receives a first DCI with the additional bitfield indicating that there is an uplink grant, the UE does not need to restart the associated timers. The additional bitfield can be part of the reserved bits in fallback DCIs as in DCI format 1-0, or can be a new bitfield as in the case of non-fall back DCIs such as DCI format 1-1. In other embodiments, the UE may be configured such that a specific bitfield from the current bitfields in the DCIs indicates to the UE to start the associated timers. In other embodiments, the UE may also receive an indication to an invalid index, e.g., an invalid MCS, which may indicate to the UE not to start the associated timers. In these embodiments, the UE is configured with the additional bitfield or interpretation of a bitfield through higher layer signaling, e.g., RRC signaling.

In other embodiments, the UE receives a new grant in a first DCI and starts the associated DRX retransmission timers. Thereafter, the UE receives a new DCI indicating that the UE should stop one or more of the associated timers. Here again an additional bitfield may be used to indicate to the UE which of the associated timers need to be stopped. Both bitmap and codepoint approach can be used to configure the UE with the additional bitfield. The additional bitfield can be configured via higher layers as in the above embodiments. Similarly, an invalid index can be used as an alternative to indicate to the UE not to start the associated timers. This embodiment is particularly useful to satisfy a bounded latency requirement. If the network node realizes that the current associated timers go beyond the guaranteed bounded latency, it can transmit a second DCI to stop the associated timers. The second DCI can have the same format as the existing scheduling or non-scheduling DCIs, or a new DCI format designed specifically to stop the associated uplink or downlink timers. The new DCI format can be UE specific or group specific, e.g., as in the case of DCI format 2-6.

In other embodiments, the DCI indication for starting or stopping the associated DRX retransmission timers is implicit. For example, if the UE receives a grant in DCI format 0-1, the UE will not start the associated uplink timers. As another example, if the UE receives a grant in DCI format 0-0, it will start the associated timers. The UE can be configured with such an implicit mechanism through higher layer signaling, e.g., RRC signaling.

In other embodiments, the UE is configured with multiple synchronization signal (SS) configurations per at least two bandwidth parts (BWPs). If the UE receives a DCI in a first SS, the UE starts the associated DRX retransmission timers. If the UE receives a DCI in a second SS, the UE does not start the associated timers. In this way, the UE is configured to start or stop the associated timers on a per SS basis. In other embodiments, the mechanism can be extended to the case where the UE is configured with multiple Control Resource Sets (Coresets).

In other embodiments, the UE is configured with one or more conditions or thresholds such that if the conditions or thresholds are satisfied, the UE can follow a configured behavior. The behavior can also be pre-configured. For example, the UE may be configured not to start the associated DRX retransmission timers if at least one of the SINR, RSRP, RSRQ or other channel quality metrics is beyond a specific threshold. In other embodiments, if the UE receives an uplink grant and the SINR is larger than about 10 dB, the UE does not start the associated uplink timers. If multiple conditions or thresholds are defined, for each threshold or thresholds, the network node can specify the number of associated retransmissions.

Figure 18:
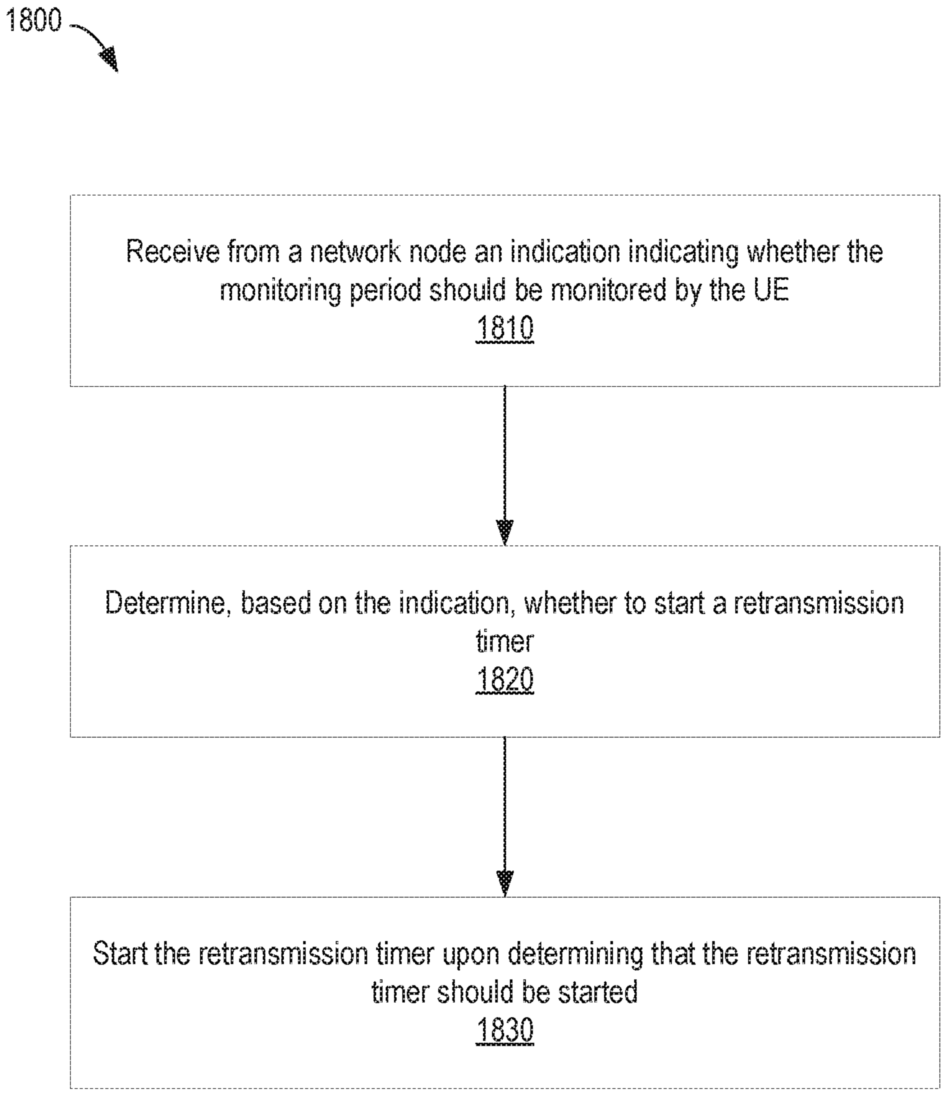
FIG. 18 is an example flowchart illustrating a method performed by a user equipment in accordance with some embodiments.

FIG. 18 is an example flowchart illustrating a method performed by a UE in accordance with some embodiments. Method 1800 may be performed by a UE 112 of FIG. 1 or a UE 200 of FIG. 2. Method 1800 includes step 1810, in which a UE receives from a network node an indication indicating whether the monitoring period should be monitored by the UE. Then, in step 1820, the UE determines, based on the indication, whether to start a DRX retransmission timer. In some embodiments, if it is determined that the retransmission timer should be started, the UE starts the retransmission timer, as illustrated in step 1830.

Figure 19:
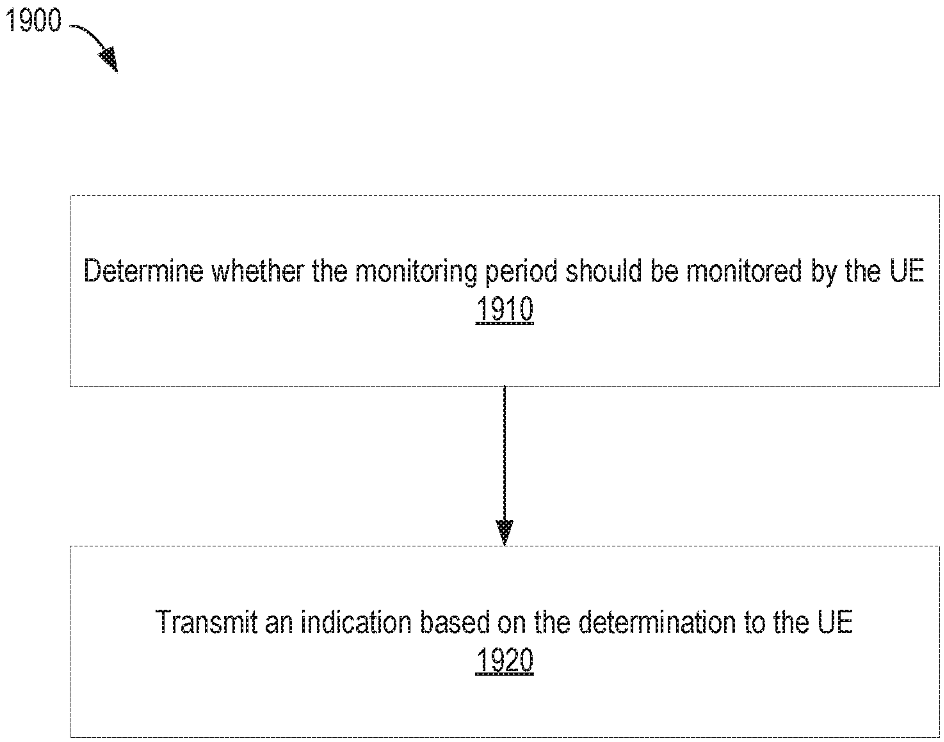
FIG. 19 is an example flowchart illustrating a method performed by a network node in accordance with some embodiments.

FIG. 19 is an example flowchart illustrating a method performed by a network node in accordance with some embodiments. Method 1900 may be performed by a network node 110 of FIG. 1 or a network node 300 of FIG. 3. Method 1900 includes a step 1910, in which the network node determines whether the monitoring period should be monitored by the UE. Then, in step 1920, the network node transmits an indication to the UE based on the determination.

Figure 20:
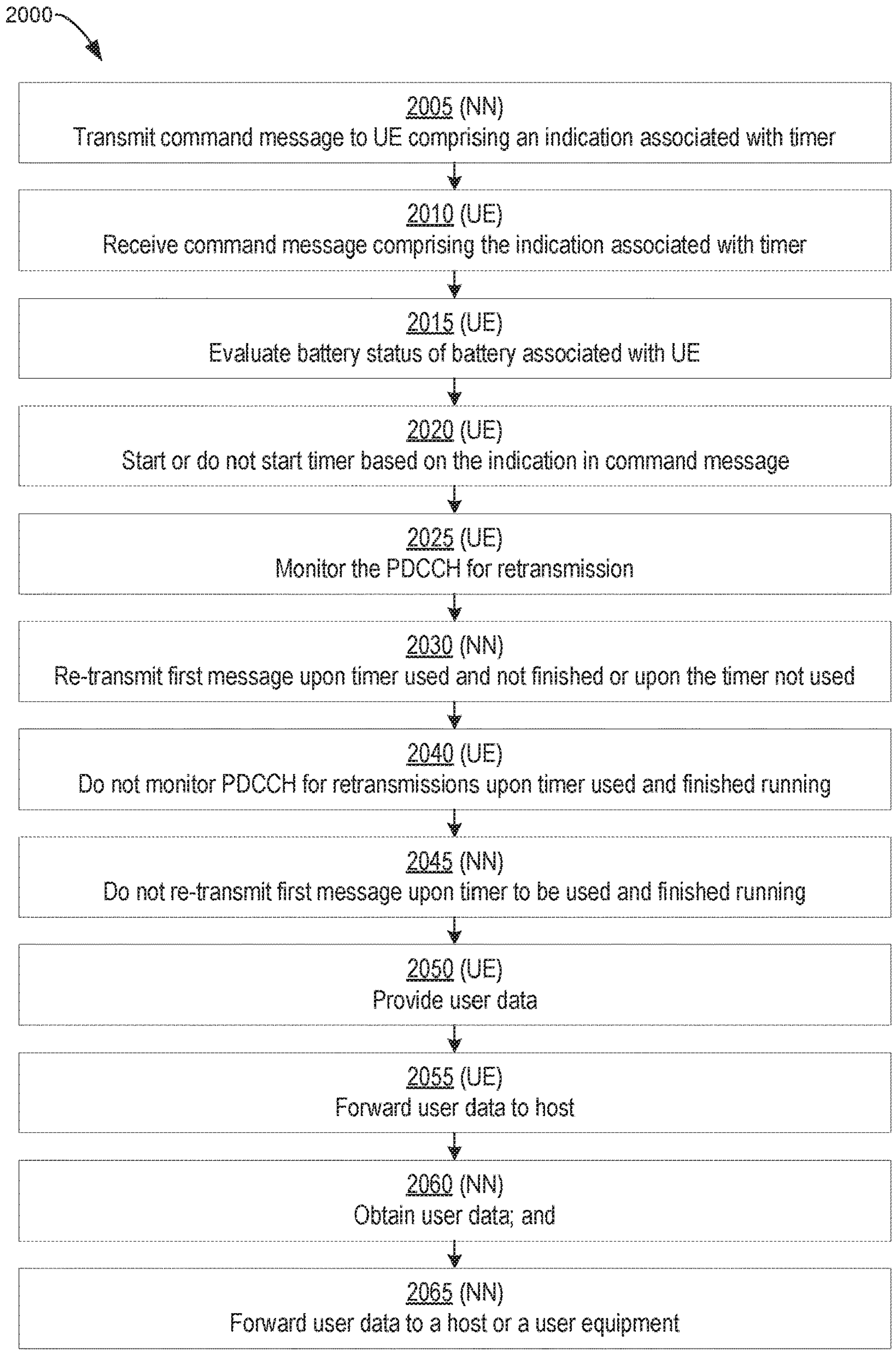
FIG. 20 is an example flowchart illustrating a method for eliminating or reducing a monitoring period for retransmission in accordance with some embodiments.

FIG. 20 is an example flowchart illustrating a method for eliminating or reducing a monitoring period for retransmission performed by a system comprising both a network node and a UE. In this embodiment, the steps performed by a user equipment (noted with a "(UE)" following the reference number) and a network node (noted with a "(NN)" following the reference number) have been combined in the example flowchart. Some steps in method 2000 are performed by a user equipment and some steps in method 2000 are performed by a network node. As depicted in FIG. 20, method 2000 begins at step 2005 where the network node transmits a command message to the UE. The command message comprises an indication that is associated with at least one DRX timer. For example, the timer may be one or more of the following timers: drx-HARQ-RTT-TimerUL, drx-Retransmission TimerUL, drx-HARQ-RTT-TimerDL, or drx-RetransmissionTimerDL. At step 2010 the UE receives the command message transmitted at step 2005.

Depending on the embodiment and/or scenario, the command message and the indication may take a variety of different forms. For example, in some instances the indication may specify the maximum number of retransmissions that the UE as allowed to monitor. In other embodiments, the indication may further include a limit on the number of times the UE starts, or restarts, the corresponding DRX retransmission timer. This limit may also be obtained by the UE through methods other than the command message (e.g., pre-programmed, received in a different message, etc.). In some embodiments, there are separate indications for an uplink and a downlink. In some embodiments, the indication may include a maximum monitoring time. When the maximum monitoring time has lapsed, any relevant timer that is still running is stopped. The maximum monitoring time facilitates limiting the amount of time the UE monitors PDCCH.

In some embodiments, the command message may be sent as part of radio resource control (RRC) signaling, or L1/L2 signaling. For example, the command message may be included in the downlink control information (DCI) in PDCCH, or it may be in a medium access control protocol control element (MAC-CE). In some embodiments, the command message comprises multiple parts. As one example, the command message comprises an RRC message and a DCI in PDCCH. As another example, the command message comprises a first part that includes an array of values associated with the number or retransmissions that the UE can monitor and a second part that includes an index that points to a value in the array. In some instances, the indication is valid when a condition exists. The condition may depend on, for example, the signal strength or noise level. In some embodiments, multiple command messages may be used such that there is a command message for each transmission. That is, the UE is informed for each transmission if the corresponding DRX retransmission timer should be started or not. In some embodiments, the command message may be in a DCI, wherein a bitfield in the DCI is used to indicate whether a DRX retransmission timer needs to start or not. In some embodiments, the UE may be configured with a plurality of synchronization signals per bandwidth part (BWP). In such a case, the command message may be such that upon the UE receiving a DCI in a first synchronization signal the UE starts the associated timer. Then, upon the UE receiving the DCI in a second synchronization signal, the UE does not start the associated timer. In some embodiments, the indication in the command message may be implicit.

At step 2015 the UE evaluates its battery status. For example, if the UE evaluates that the battery is below a threshold, the UE may limit the number of times and/or the amount of time it spends monitoring for retransmission.

At step 2020 the UE starts a DRX retransmission timer if the command message indicates that the timer is to be used, or it does not start a DRX retransmission timer if the command message indicates that the timer is not to be used.

At step 2025 the UE monitors the PDCCH for retransmission and at step 2030 the network node re-transmits a first message. The monitoring and retransmission are done if either timer is used and has not finished running or the timer is not used. In some embodiments, the UE may stop monitoring the PDCCH for retransmission but the network node may still re-transmit messages. In that case, the UE just will not receive the retransmitted packets because the UE has stopped monitoring the retransmission.

At step 2040, the UE does not monitor PDCCH for retransmission if a DRX retransmission timer has been used and finished running. Accordingly, in some embodiments, the network node may be aware that the UE is not monitoring. At step 2045 the network node may not re-transmit the first message. In some embodiments, where the UE determines that the retransmission timer has run out (or will run out soon), the UE may skip sending a NACK transmission even if it has not completely received the transmission. In some embodiments, a second command message may be received (not depicted in FIG. 20) indicating that the retransmission timer is to stop.

At step 2050, the UE provides user data (e.g., a request for data based on user input). At step 2055 the UE forwards the user data to a host computer via the network node. At step 2060 the network node obtains the user data. At step 2065 the network node then forwards the user data to the host computer. User data can also flow in the opposite direction in which the network node obtains user data and then forwards the data to the UE.

Figure 21:
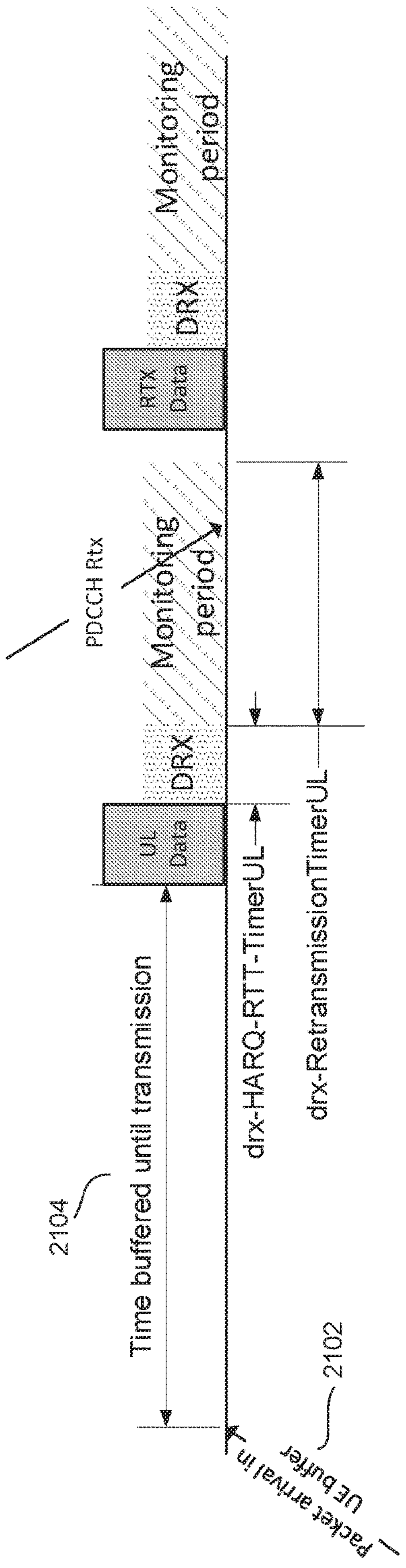
FIG. 21 illustrates an example signal diagram of an uplink scenario in accordance with some embodiments.

In some embodiments, the indication of whether a UE will monitor retransmissions is different between uplink and downlink. FIG. 21 illustrates an example signal diagram of an uplink scenario in accordance with some embodiments. In FIG. 21, a UE has information 2102 about the timing of when a data packet arrives at, or is buffered at, the UE's memory. The UE also has information 2104 about the length of time between when the data packet is buffered and when the data is being transmitted. In addition, the UE also has information about the latency budget for a given Application Data Unit (ADU) (not shown in FIG. 21). Based on the aforementioned information, the UE can indicate to the network node whether it will monitor the PDCCH for retransmission.

Figure 22:
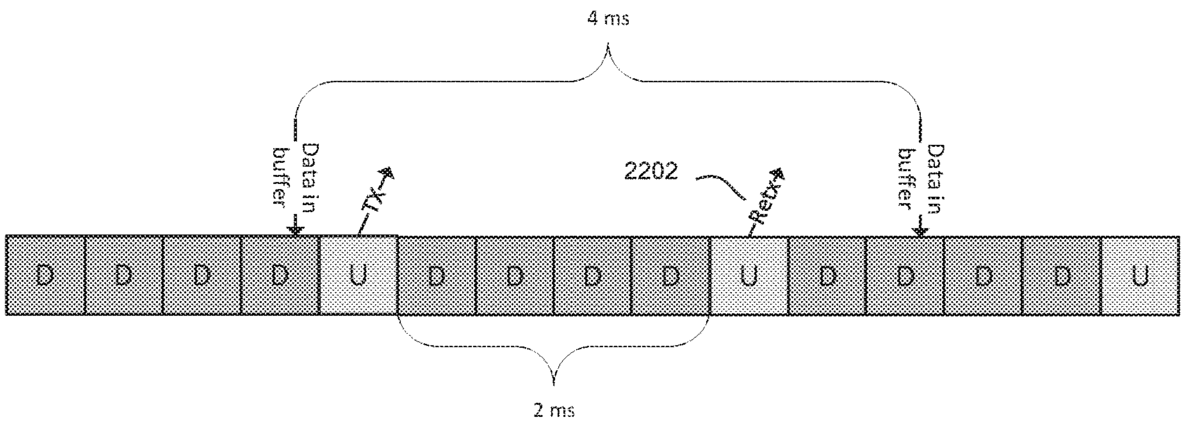
FIG. 22 illustrates an example Time Division Duplex (TDD) pattern of an uplink scenario in which a packet is retransmitted in accordance with some embodiments.

FIG. 22 illustrates an example Time Division Duplex (TDD) pattern of an uplink scenario in which a packet is retransmitted in accordance with some embodiments. FIG. 22 represents a 30 KHz numerology TTD pattern with 4 slots for downlink and 1 slot for uplink. In this example, the UE will monitor the PDCCH for retransmission (resulting in the retransmission packet 2202 being sent) when the retransmission may still reach the network node within the latency requirements of the ADU.

Figure 23:
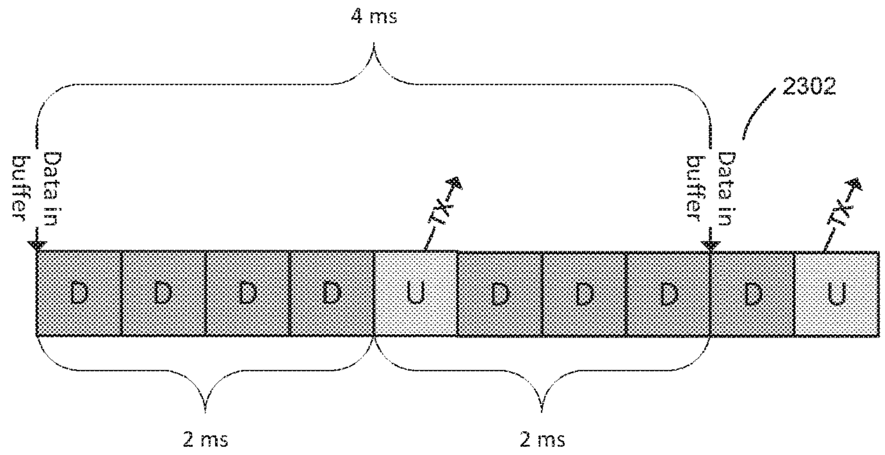
FIG. 23 illustrate an example TDD pattern of an uplink scenario in which a packet is not retransmitted in accordance with this embodiment.

On the other hand, the UE will not monitor the PDCCH for retransmission when the retransmission may exceed the latency requirements of the ADU. In some embodiments, a second ADU may arrive before the retransmission is sent. If the second ADU outdates the information in the first ADU, the UE may choose not to monitor the PDCCH for retransmission (resulting in the UE not performing the retransmission). FIG. 23 illustrates an example TDD pattern of an uplink scenario in which a packet is not retransmitted in accordance with this embodiment. FIG. 23 represents a 30 KHz numerology TDD pattern with 4 slots for downlink and 1 slot for uplink. In this example, the second ADU 2302 arrives before the retransmission is sent. As a result, the retransmission is not performed by the UE.

In the uplink scenario of some embodiments, a network node cannot accurately estimate whether a retransmission is desirable. This is because the network node lacks the information about how long the data packet has been buffered at the UE. The network node also lacks the information about whether a second ADU has arrived, and whether the second ADU may potentially outdate the information in the first ADU. Since the UE has this information, for uplink transmissions, it is desirable that the UE indicates whether the UE will monitor the PDCCH for retransmission.

In some embodiments, the UE will add a Monitor Flag in uplink MAC PDU indicating whether the UE will monitor the PDCCH for retransmission following the corresponding timers.

There are multiple options to include this indication in an uplink MAC PDU. In some embodiments, the Monitor Flag can be included in a MAC sub-header. In other embodiments, the Monitor Flag can be added in a MAC Control Element (MAC CE) in the MAC PDU.

Figure 24:
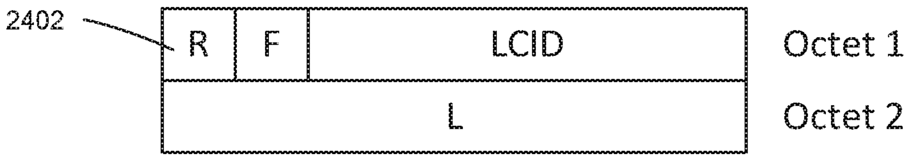
FIG. 24 illustrates an example Medium Access Control Protocol (MAC) subheader.
Figure 25:
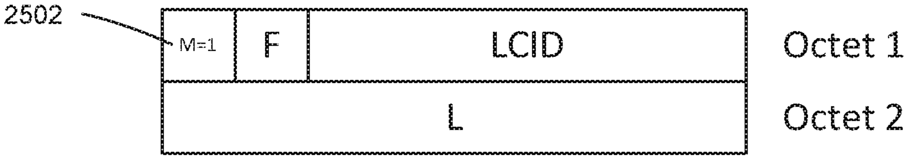
FIG. 25 illustrates an example MAC subheader in which the reserve bit is set to 1.

FIG. 24 illustrates an example Medium Access Control Protocol (MAC) sub-header. Depending on whether the MAC sub-header is configured with a longer L field or eLCID, the MAC sub-header may include additional octets as specified in 3GPP specifications. The "R" (Reserved) bit 2402 of the MAC sub-header can be used to indicate whether the UE will monitor the PDCCH for retransmission. If the UE will monitor for retransmission, the UE will set the Monitor Flag to "1", as illustrated in FIG. 25 where the reserved bit 2502 is set to 1.

In some embodiments, a MAC PDU may carry one or more MAC sub-PDUs, which may include a MAC sub-header and a MAC sub-SDU. The Monitor Flag may be included in one or more MAC sub-PDUs. In some embodiments, it is desirable if the Monitor Flag is indicated in the first MAC sub-header of the first MAC sub-PDU. In this way, the network node can quickly learn whether the UE will monitor the PDCCH for retransmission. In the event the network node knows that UE will monitor the PDCCH and an uplink retransmission is needed, the network code can schedule the PDCCH early to indicate a retransmission.

Figure 26:
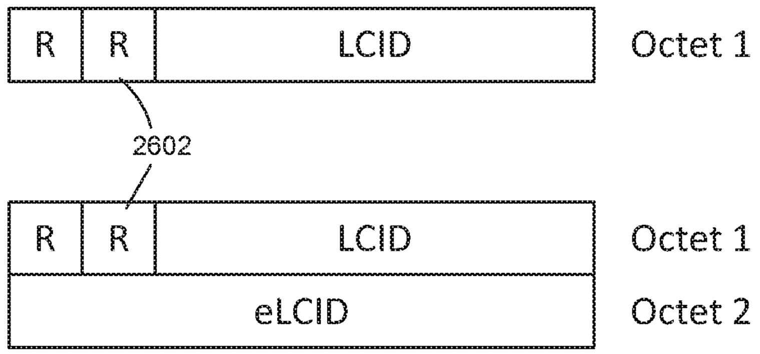
FIG. 26 illustrates two formats of MAC CE subheaders for non-variable size MAC CEs.
Figure 27:
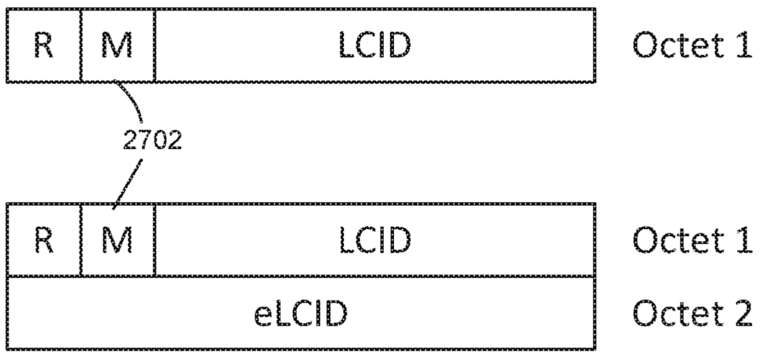
FIG. 27 illustrates two formats of MAC CE subheaders for non-variable size MAC CEs in which the reserve bits are set to 1.

In some embodiments, the UE will add the Monitor Flag in a MAC Control Element. FIG. 26 illustrates two formats of MAC CE sub-headers for non-variable size MAC CEs. The "R" (Reserved) bits of both formats of the MAC CE sub-header can be used to indicate whether the UE will monitor the PDCCH for retransmission. If the UE will monitor for retransmission, the UE will set the Monitor Flag to "1", as illustrated in FIG. 27 where the reserved bits (now marked as "M" bits) are set to 1. In this situation, any LCID specified for the use of a MAC CE can be also indicated. If code index LCID 33 or 34 is indicated, when the Monitor Flag is set to "1", the additional eLCID field may not be included. This mechanism can minimize the MAC-CE sub-header overhead.

In some embodiments, the Monitor Flag can be included in LCID or eLCID. The UE sets all the MAC CEs at the end of the uplink MAC PDU. In some embodiments, it is desirable if the LCID or eLCID is set at the beginning of the uplink MAC PDU.

In some embodiments, a UE can perform partial monitoring by further indicating how many slots or time the UE will monitor within the preconfigured monitoring window. This partial monitoring duration information can be defined based on a predetermined table. The UE can send an index of the table corresponding to the partial monitoring time. The partial monitoring time can also be defined in a relative manner or an absolute manner. For the relative manner, the portion of the monitoring window is defined by the two DRX retransmission timers, drx-HARQ-RTT-TimerUL and drx-RetransmissionTimerUL. In the absolute manner, the monitoring window is indicated by the number of time slot for monitoring.

In some embodiments, the UE's indication of whether it will monitor for retransmission can also be sent via the physical layer channel for uplink, which is faster than indicating through the L2 signaling. This mechanism also prevents potential MAC PDU error. Uplink Control Information (UCI) can include UE's indication of the above-mentioned information. In some embodiments, indicating in UCI is allowed only when an uplink control channel is configured. In some embodiments, if PUCCH is not configured but a grant is configured via PUSCH, a UE can indicate whether it will monitor for retransmission via MAC CE or MAC sub-header. In some embodiments, the UE indicates to the network node whether it will monitor for PDCCH for retransmission. After the UE sends the indication to the network node, the UE may follow a predetermined procedure. In some embodiments, when a UE indicates "no monitor," the UE immediately goes to sleep mode until the next ON duration in DRX. In some embodiments, a UE may wait for an explicit confirmation signal from the network node, e.g., the PDCCH for the first retransmission or any other signal. In some embodiments, the UE may follow the network node's indication of whether to turn off the monitoring period. In addition of these actions, when the UE decides that it will not monitor the PDCCH for retransmission, the UE may flush the buffer for the corresponding HARQ process. Further, to help a network updating the buffer information more accurately after UE's monitoring period, the UE may also indicate explicitly that late packets have been dropped.

When a network node receives a UE's indication of "no monitoring," the network node will also update the buffer information of the UE so that the network node does not need to send a new grant. In addition, the network node will not schedule a PDCCH for retransmission in the corresponding HARQ process. When a network node receives a UE's indication of partial monitoring, the network node will schedule a PDCCH for retransmission to be sent. This is to allow UE to send retransmission before it is too late. The network node may also update the buffer information of the UE if PDCCH for retransmission is not sent before the indicated monitoring time.

Figure 28:
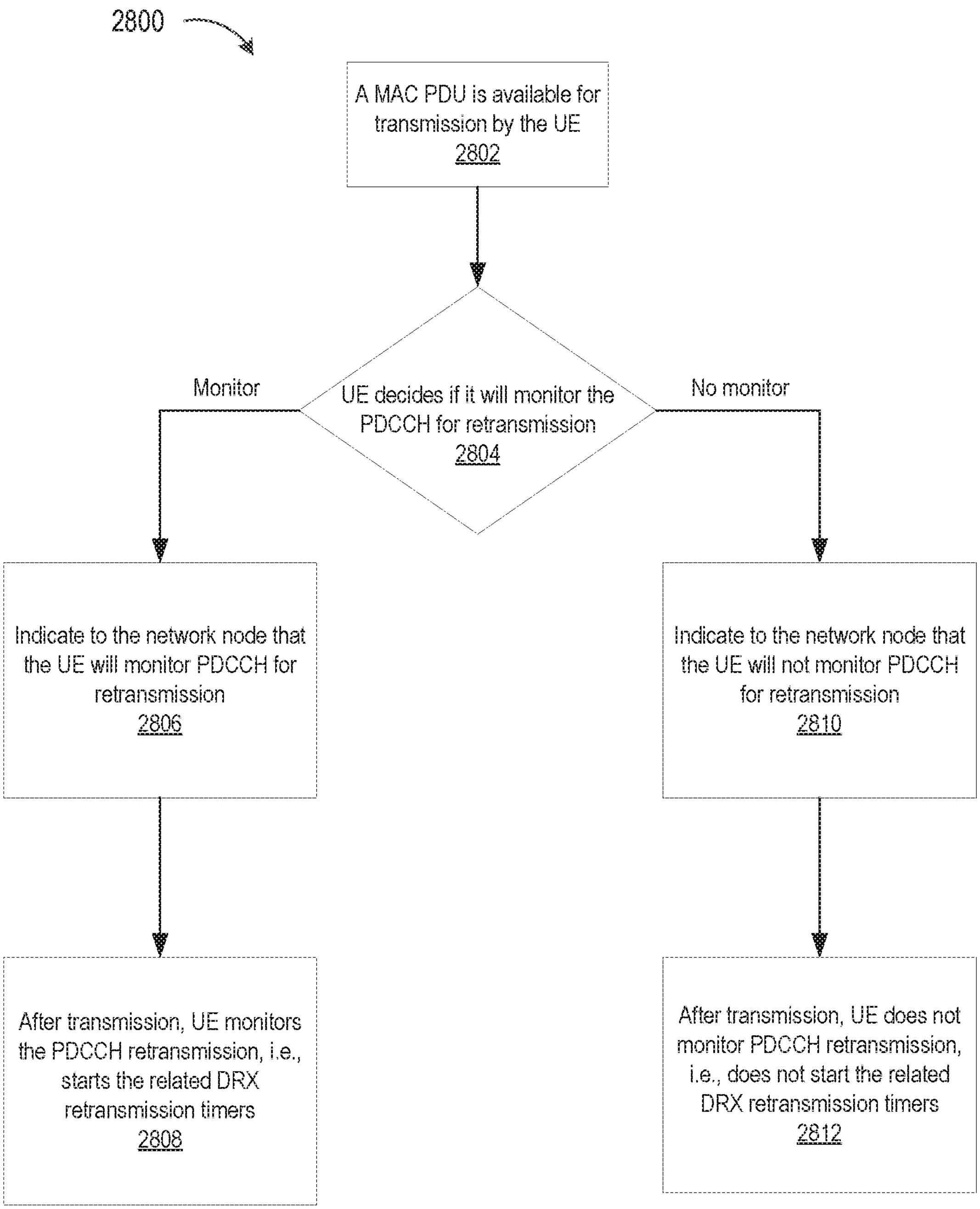
FIG. 28 is an example flowchart illustrating a method of a UE indicating and monitoring the PDCCH for retransmission in accordance with some embodiments.

FIG. 28 is an example flowchart illustrating method 2800 of a UE indicating and monitoring the PDCCH for retransmission in accordance with some embodiments. In step 2802, a MAC PDU is available for transmission by the UE. In step 2804, the UE decides if it will monitor the PDCCH for retransmission based on the information available to the UE. If the UE decides to monitor for retransmission, method 2800 proceeds to step 2806. In step 2806, the UE indicates to the network node that the UE will monitor PDCCH for retransmission. After the transmission of the indication, method 2800 proceeds to step 2808, in which the UE monitors the PDCCH for retransmission by starting the related DRX retransmission timers. If in step 2804, the UE decides not to monitor the PDCCH for retransmission, method 2800 proceeds to step 2810. In step 2810, the UE indicates to the network node that the UE will not monitor PDCCH for retransmission. After the transmission of that indication, method 2800 proceeds to step 2812, in which the UE does not monitor the PDCCH for retransmission by not starting the related DRX retransmission timers.

The foregoing specification is to be understood as being in every respect illustrative and exemplary, but not restrictive, and the scope of the invention disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

ABBREVATIONS

TTI Time Transmission Interval
RAN Radio Access Network
XR extended Reality
SI Study Item
WI Work Item
CN Core Network
fps Frames per second
IP Internet Protocol
TB Transport block
KB Kilobytes
Mbps Megabits per second
Head mounted display
HMD
AR Augmented Reality
Discontinuous Transmission
DRX
UE User equipment
DL Downlink
UL Uplink
PDCCH Physical Dedicated Control Channel
DCI Downlink Control Information
HARQ Hybrid Automatic Repeat Request
ADU Application Data Unit
PDU Protocol Data Unit
NW Network
MAC CE MAC Control Element
MAC Medium Access Control Protocol
RRC Radio Resource Control Protocol
CG Configured Grant
MCS Modulation and Coding Scheme

What is claimed is:

1. A method performed by a user equipment (UE) for eliminating or reducing a monitoring period for retransmission associated to Discontinuous Reception (DRX), the method comprising:

receiving, from a network node, an indication of whether the monitoring period should be monitored by the UE;

determining, based on the indication, whether to start a retransmission timer; and starting the retransmission timer upon determining that the retransmission timer should be started, wherein the indication is indicated in a plurality of synchronization signal configurations per bandwidth part, wherein, upon receiving a DCI in a first synchronization signal, the UE starts the retransmission timer, and upon receiving the DCI in a second synchronization signal, the UE refrains from starting the retransmission timer.

2. The method of claim 1, wherein the retransmission timer is associated with at least one timer of a plurality of DRX retransmission timers.

3. The method of claim 1, wherein receiving, from the network node, the indication of whether the monitoring period should be monitored by the UE comprises:

receiving a maximum number of retransmissions.

4. The method of claim 1, further comprising limiting a number of times the UE starts or restarts the retransmission timer.

5. The method of claim 1, wherein the indication is received separately for an uplink and a downlink.

6. The method of claim 1, further comprising skipping a Negative Acknowledgement (NACK) transmission based on the indication.

7. The method of claim 1, wherein the indication comprises a maximum monitoring time, the method further comprising stopping the retransmission timer after the maximum monitoring time has expired.

8. The method of claim 1, wherein determining whether to start a retransmission timer is further based on a battery status of a battery associated with the UE.

9. The method of claim 1, wherein the indication is received in at least one of Radio Resource Control (RRC) signaling, Layer 1 signaling, Layer 2 signaling, Downlink Control Information (DCI) in a Physical Dedicated Control Channel (PDCCH), and a Medium Access Control-Control Element (MAC-CE).

10. The method of claim 1, wherein the indication comprises information indicating whether the retransmission timer should be used.

11. The method of claim 1, wherein the indication comprises an array of values associated with a maximum number of retransmissions and an index pointing to a value in the array.

12. The method of claim 1, wherein receiving, from the network node, the indication of whether the monitoring period should be monitored by the UE comprises:

receiving the indication in each PDCCH indicating whether the retransmission timer should be started.

13. The method of claim 1 further comprising:

receiving, from the network node, a second indication indicating whether the UE should stop the retransmission timer; and stopping the retransmission timer upon receiving the second indication indicating that the UE should stop the retransmission timer.

14. The method of claim 1, wherein determining, based on the indication, whether to start the retransmission timer comprises:

determining whether to start the retransmission timer based on at least one of a plurality of channel quality metrics.

15. A user equipment (UE) for eliminating or reducing a monitoring period for retransmission associated to Discontinuous Reception (DRX), comprising:

a transceiver, a processor, and a memory, said memory containing instructions executable by the processor whereby the UE is operative to:

receive, from a network node, an indication of whether the monitoring period should be monitored by the UE;

determine, based on the indication, whether to start a retransmission timer; and start the retransmission timer upon determining that the retransmission timer should be started, wherein the indication is indicated in a plurality of synchronization signal configurations per bandwidth part, wherein, upon receiving a DCI in a first synchronization signal, the UE starts the retransmission timer, and upon receiving the DCI in a second synchronization signal, the UE refrains from starting the retransmission timer.

* * * * *